(12) United States Patent
Lee et al.

(10) Patent No.: US 7,108,250 B2
(45) Date of Patent: Sep. 19, 2006

(54) APPARATUS AND METHOD FOR PRODUCING SMALL GAS BUBBLES IN LIQUIDS

(75) Inventors: Douglas Lee, Calgary (CA); Dennis Nicholas Szilagyi, Calgary (CA)

(73) Assignee: GLR Solutions Ltd., Calgary (CA)

( * ) Notice: Subject to any disclaimer, the term of this patent is extended or adjusted under 35 U.S.C. 154(b) by 0 days.

(21) Appl. No.: 11/338,779

(22) Filed: Jan. 25, 2006

(65) Prior Publication Data

US 2006/0118978 A1 Jun. 8, 2006

Related U.S. Application Data

(62) Division of application No. 10/795,239, filed on Mar. 9, 2004.

(51) Int. Cl.
*B01F 3/04* (2006.01)
(52) U.S. Cl. .............. 261/28; 261/76; 261/DIG. 75
(58) Field of Classification Search ............ 261/28, 261/29, 76, 77, 115, 116, DIG. 75
See application file for complete search history.

(56) References Cited

U.S. PATENT DOCUMENTS

| | | | | |
|---|---|---|---|---|
| 2003/0183584 A1* | 10/2003 | Galatro et al. | ............. | 210/760 |
| 2004/0217068 A1* | 11/2004 | Kirby | .................. | 210/760 |
| 2005/0072299 A1* | 4/2005 | Thomas | ................. | 95/226 |

* cited by examiner

*Primary Examiner*—Scott Bushey
(74) *Attorney, Agent, or Firm*—Gowling Lafleur Henders LLP; D. Doak Horne

(57) ABSTRACT

An apparatus for creating microbubbles of gas in a liquid. A vertical pipe member is adapted to receive a liquid-gas mixture having gas bubbles of larger diameter therein. A series of horizontally-extending apertures are provided to permit the pipe member to expel such liquid-gas mixture radially outwardly from such pipe member. The expelled liquid-gas mixture may contact the sides of a containment vessel. In a refinement of the invention, a specific relationship is further specified between the exit area of the apertures and the interior cross-sectional area of the pipe member, in order to most suitably convert the gas bubbles in such liquid-gas mixture to microbubbles of a desired small size when expelled under pressure from such pipe member via such apertures. A method of converting gas bubbles in such liquid-gas mixture to gas microbubbles is further disclosed.

5 Claims, 13 Drawing Sheets

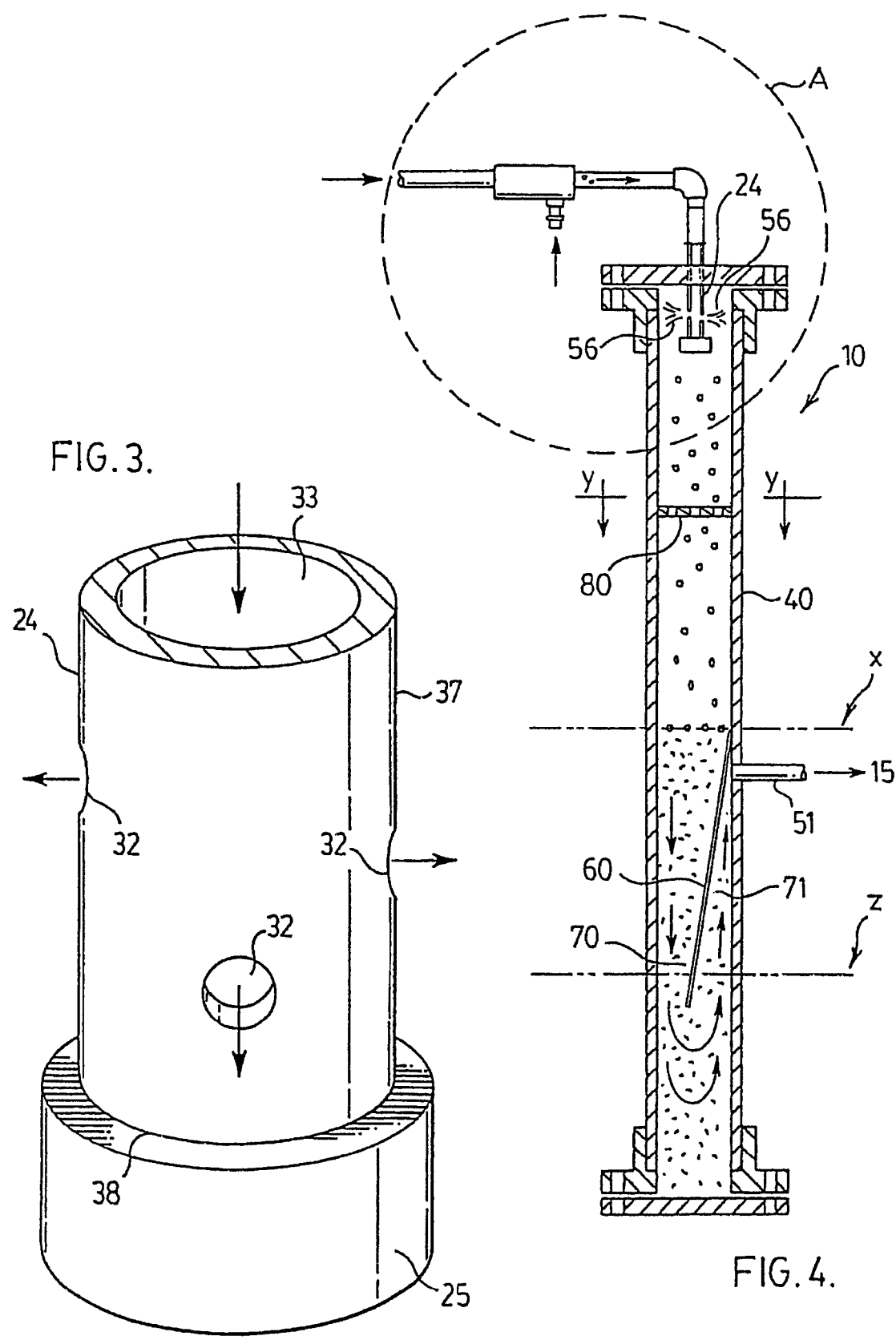

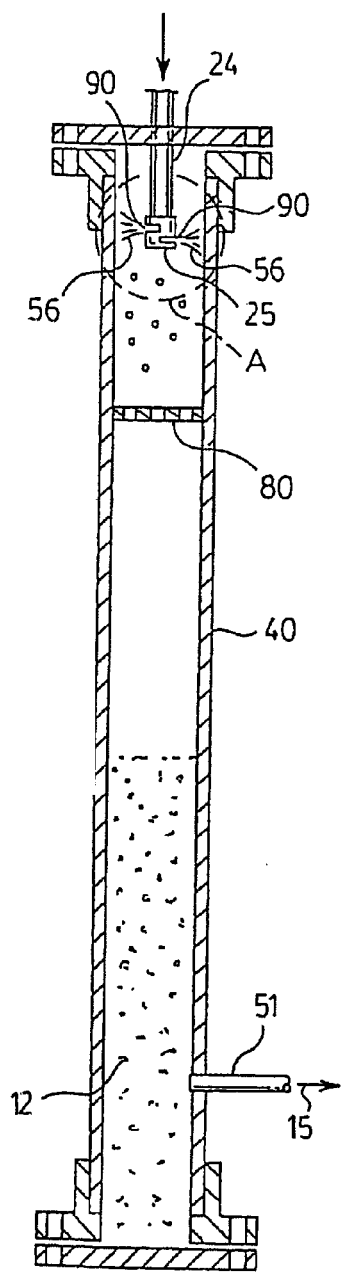
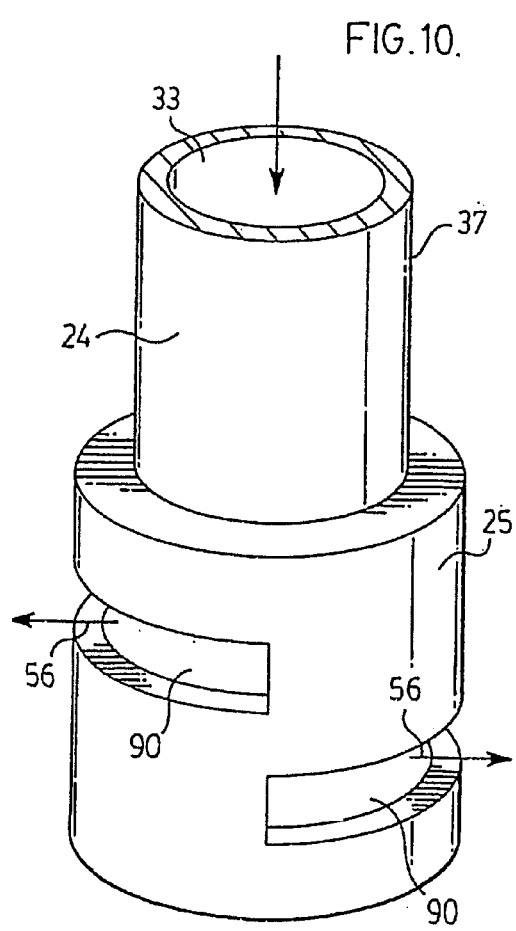
FIG.9.
FIG.10.

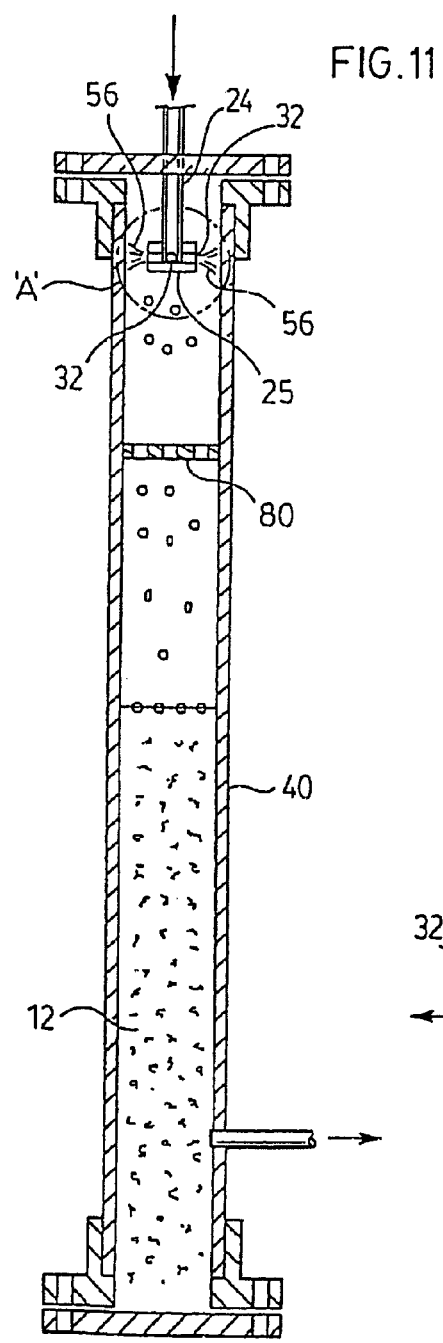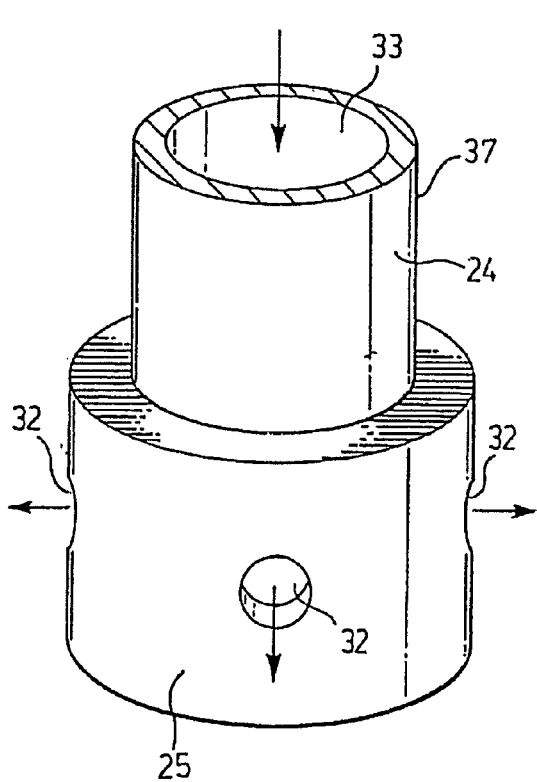

FIGURE 16

| Temp Air = 21°C | Amb. Air Pres. = 101.4kPa | |
|---|---|---|
| Temp Water = 15°C | Run Time = 35 min. | |
| Di = .824 in | $D_a$ = 1.05 in | $A_i = \pi D_i^2 / 4 =$ in² |

| Aperture Size $D_A$ (in) | $D_A(Max) = \frac{A_i}{(circumf)} = \frac{A_i}{\pi \times D_a}$ | # of Holes | $\sqrt{\frac{D_i^2}{nD_A}}$ | Exit Area $A_e$ $(n \times \pi D^2)$ in² | $A_{e_{max}} = A_i \times \frac{D_i}{D_a}$ (in²) | Back Pressure (psi) | Flow Rate (gpm) | Avg. Bubble Velocity (mm/s) | Avg. Bubble Diameter (μm) |
|---|---|---|---|---|---|---|---|---|---|
| 5/32 = .161 | .161 | 5 | .326 | .0959 | .4184 | 20 | 9 | 0.75 | 39.17 |
| 5/32 = .161 | .161 | 10 | .230 | .1917 | .4184 | 20 | 10 | 0.74 | 39.13 |
| 5/32 = .161 | .161 | 16 | .182 | .3068 | .4184 | 20 | 10 | 0.48 | 31.37 |
| 5/32 = .161 | .161 | 18 | .122 | .3451 | .4184 | 20 | 10 | .89 | 42.71 |
| 5/32 = .161 | .161 | 19 | .167 | .3643 | .4184 | 20 | 10 | 1.21 | 49.92 |
| 5/32 = .161 | .161 | 20 | .161 | .3835 | .4184 | 20 | 10 | 0.78 | 40.01 |
| 5/32 = .161 | .161 | 21 | .159 | .4027 | .4184 | 20 | 10 | 0.75 | 39.17 |
| 5/32 = .161 | .161 | 22 | .155 | .4218 | .4184 | 20 | 10 | 2.26 | 68.26 |
| 5/32 = .161 | .161 | 23 | .152 | .4410 | .4184 | 20 | 10 | 1.37 | 53.2 |
| 5/32 = .161 | .161 | 24 | .149 | .4602 | .4184 | 20 | 10 | 2.28 | 68.45 |
| 5/32 = .161 | .161 | 25 | .146 | .4794 | .4184 | 20 | 10 | 1.40 | 53.66 |
| 11/64 = .172 | .161 | 16 | .182 | .3712 | .4184 | 20 | 10 | 2.66 | 74.03 |
| 9/64 = .141 | .161 | 22 | .155 | .3417 | .4184 | 20 | 10 | 1.00 | 45.38 |
| 9/64 = .141 | .161 | 25 | .146 | .3883 | .4184 | 20 | 10 | 1.00 | 45.38 |
| 9/64 = .141 | .161 | 26 | .143 | .4038 | .4184 | 20 | 10 | 1.20 | 49.71 |
| 9/64 = .141 | .161 | 27 | .141 | .4194 | .4184 | 20 | 10 | 1.67 | 58.71 |
| 1/8 = .125 | .161 | 34 | .125 | .4172 | .4184 | 20 | 10 | 1.18 | 49.23 |
| 1/8 = .125 | .161 | 35 | .123 | .4295 | .4184 | 20 | 10 | 2.09 | 65.60 |
| 11/64 = .172 | .161 | 2 | .516 | .0464 | .4184 | 18 | 7 | 2.36 | 69.73 |
| 11/64 = .172 | .161 | 3 | .421 | .0696 | .4184 | 20 | 7.5 | 3.30 | 82.44 |
| 1/16 = .0625 | .161 | 135 | .00628 | .4142 | .4184 | 20 | 10 | 0.80 | 40.59 |
| 1/16 = .0625 | .161 | 136 | .00626 | .4172 | .4184 | 20 | 10 | 1.00 | 45.38 |
| 9/64 = .141 | .161 | 7 | .276 | .1087 | .4184 | 20 | 7.5 | 1.20 | 49.71 |

*Bold face designates $A_e > A_{e(max)}$, or $D_A > A_i/circ$

APPARATUS AND METHOD FOR PRODUCING SMALL GAS BUBBLES IN LIQUIDS

RELATED APPLICATIONS

This application is a divisional of U.S. Ser. No. 10/795,239 filed Mar. 9, 2004, published as US 2005/0040548 A1, claiming priority from CA 2,437,948 filed Aug. 21, 2003 and CA 2,460,123 filed Mar. 8, 2004, and is directed inter alia to subject matter of claims 39, 40, & 41 of publication US 2005/0040548 A1, and is incorporated herein by reference.

FIELD OF THE INVENTION

The present invention relates to an apparatus and method for aeration and purification of liquids, and more particularly to an apparatus and method for producing small gas bubbles in liquids for purification and aeration of said liquids.

BACKGROUND OF THE INVENTION

Entrainment of a gas in a liquid is required in numerous industrial processes, typically for the purposes of reacting the gas with such liquid or materials in such liquid, such as dissolved ions or finely dispersed solids, to cause reaction of such gas with materials therein to cause same to be neutralized by, react with, or precipitate or be filtered out of such liquid.

For example, it is known to bubble ozone through water, to allow the ozone to react and combine with dissolved minerals and/or finely dispersed solids within the water, so as to form solid products which may either precipitate out of the liquid or be filtered from the water, so as to thereby purify the water. The ozone may further react with harmful bacteria or the like in the water so as to render them harmless or odourless.

Where a gas is desired to react with a liquid or finely dispersed solids in such liquids, it is widely known that small bubbles of gas immersed in such liquid will have, for the same volume of gas, a greater surface area and thus a greater liquid/gas interface, than the same volume of gas when such gas exists in larger bubbles.

A large gas/liquid interface is a desirable characteristic in instances where the gas is introduced into a liquid for the purposes of reacting the gas with the liquid or dispersed solids in such liquid, since greater surface area of the gas exposed to such liquid and/or finely dispersed solids in such liquid decreases the time it takes for the gas to react with the liquid or finely dispersed solids within such liquids, thus allowing quicker processing. As well, a lesser amount of gas, and smaller containment vessels, can thus be used, resulting in cost savings.

The benefits, therefore, of introducing or entraining very small bubbles of gas, typically in the range of 50 to 100 microns in diameter, into a liquid for the purposes of increasing the surface area of the gas relative to the liquid (and/or finely dispersed solids in such liquid) are known. Small bubbles of this size are generally referred to in the art as microbubbles. For the purposes hereinafter of this disclosure, microbubbles will be referred to and will be understood as meaning gas bubbles of a diameter in the range of 50 to 100 microns, and preferably 5 to 50 microns.

A number of devices and methods for aerating liquids, typically water, with gas bubbles, are known.

For example, U.S. Pat. No. 2,890,838 teaches a device for filter-separating iron from water. Water is delivered via a pipe 13 to an air aspirator 14, and thereafter such water having air entrained therein is delivered via pipe 16 to the upper portion of a tank 10, where it passes vertically downwardly in the tank 10 to a spray valve 19. At the spray valve 19 the water-air mixture flows outwardly through openings 21 into chamber 22 formed in a cylindrical hollow body 23 mounted on valve 19. The upper end of the body 23 is cone shaped, and contacts the mating lower cone-shaped end 25 of valve body 26. The water-air mixture flows upwardly and outwardly through the cone-shaped opening formed between cone-shaped surfaces 24,25 in the form of a vaporized spray S, as shown in FIGS. 2 & 4 thereof, and mixes with the air in the tank 10 as it strikes the underside 27 of the top 28 of the tank 10, thereby introducing air into the liquid which in turn oxidizes metabolic iron present in the water. Iron precipitates then settles out of solution and down through the water contained in tank 10.

U.S. Pat. No. 5,601,724 and U.S. Pat. No. 5,460,731 teach an apparatus and method, respectively of aerating liquids. FIGS. 1 & 2 of each of '724 and '731 show a venturi air injector 10 used to inject air into water in a conduit 12. Such air-water mixture enters the bottom portion of a tower-like pressure vessel 14, where it is directed upwardly via conduit 30, where it is directed through a cylindrical restriction gap 19 formed between the second end 34 of conduit 30 and the top 18 of vessel 14. The gas, being of lesser density, passes more quickly through the restriction, thereby accelerating the liquid. As the liquid exits the restriction gap 19 it pneumatically hammers against the top 18 of pressure vessel 14. Thereafter the liquid stream, by force of gravity, cascades through the gas in pressure vessel 14 downwardly to further impact plate 35. Thereafter the liquid stream then passes through openings 37 in plate 35 and by force of gravity cascades through the gas in pressure vessel 14 to further impact on liquid at the bottom of the vessel. Thereafter such liquid, having small bubbles of air entrained therein, is removed via a conduit from the bottom of vessel 14.

U.S. Pat. No. 5,096,596 to a "Process and Apparatus for Removal of Mineral Contaminants from Water" teaches a pressurized aeration tank 24 having a tube 26 located within said tank 24 which supplies the tank 24 with raw water, which is introduced to the tank 24 via the tube 26 via a plurality of holes 28 in the tube (ref. col. 2, lines 49–54 and FIGS. 1–7). The tube 24 only supplies "raw water" and not water having air bubbles entrained therein, and is not for the purpose of providing gas microbubbles of a range of 5–50 microns. Most importantly, no relationship regarding the size of the holes 28 in the tube 24 is specified to attempt to attain microbubbles, even if the patent further provided for the raw water to first have bubbles introduced therein.

U.S. Pat. No. 4,556,523 teaches a microbubble injector usable to separate material of different density by flotation, wherein microbubbles of gas are introduced into a chamber 14 containing a liquid mass 16. As may be seen from FIG. 1 of US '523, a gas admixture device 4 receives air through an inlet 6 and ordinary water through an inlet 8. The resulting air-water mixture is supplied by a conduit to the bottom of chamber 14, where it passes through an injector wall 10 via an injector hole 12 to procure a high velocity jet of air water. A deflector wall 18 is disposed over such injector hole, so as to create a narrow gap around the injector hole, which the water/air mixture must pass through. The injector hole is preferably substantially circular, and the height of the passage between the injector and deflector wall at the edge of the injector hole is less than one quarter of the diameter of the injector hole in the injector wall.

Disadvantageously, none of the aforementioned patents teach or disclose any specific design interrelation between the dimensions of the injector holes/parts/or gaps and the conduit outer dimensions which will best produce microbubbles in the liquid.

For example, US '838 simply provides a nut 23 on the end of the valve 24 to adjust the size of the aperture between cone surfaces 24,25 through which the water must pass. No gap dimension is ever specified which best provides bubbles of a desired small size.

Similarly, each of US '724 and '731 simply disclose that the size of the restriction gap 19 required is dependent upon the size of the bubbles that are produced, with no direction as to what gap size will produce microbubbles in the range of less than 100 microns. These two patents each go on to note that (at col. 6, lines 44 to 47) that the greater the diameter of the cylindrical edge, the closer the end of conduit 30 had to be positioned to the top 18 of the pressure vessel 14 (i.e. the smaller the restriction gap had to be) in order to form bubbles of the desired size. No desired size of bubbles was ever identified, nor was there ever any relationship specified between the gap size and the diameter of the pipe, which would produce the smallest bubbles, namely microbubbles of diameter in the 5–100 micron range.

U.S. Pat. No. 4,556,523 perhaps comes closest to specifying an interrelation between the components in order to achieve desired small microbubble size in the range of 50 to 100 microns, specifying as noted above that the passage between the injector and deflector wall at the edge of the injector hole is less than one quarter of the diameter of the injector hole in the injector wall. No specific optimum size was specified. Moreover, the particular manner by which the microbubbles are created, namely requiring an injector wall 10 and deflector wall 14, requires substantial quantity of material, and is thus a particularly material-intensive design and thus relatively costly.

Accordingly, a clear and real need exists for an aeration apparatus of simple and relatively inexpensive design having a configuration wherein the size of the flow aperture(s) through which a gas/liquid mixture flows can be accurately designed so as to give microbubbles of the desired small size.

SUMMARY OF THE INVENTION

In order to meet the above need for a device of simple and relatively inexpensive design able to introduce gas microbubbles into a liquid, in a broad aspect of the present invention such invention comprises an apparatus having means for creating microbubbles in a liquid, comprising:

means for introducing gas bubbles, the majority of which are of a size greater than 100 microns, into a liquid to from a liquid-gas mixture;

elongate, hollow pipe means, substantially symmetrical in cross-section of interior cross-sectional area, positioned substantially vertically, adapted to receive said liquid-gas mixture under first pressure and supply said liquid-gas mixture to aperture means, said pipe member having plug means situate at a lowermost distal end thereof for preventing egress of liquid vertically downward from said distal end;

said aperture means situate on said pipe means and disposed in one or more planes each substantially perpendicular to a longitudinal axis of said pipe means and extending from an interior of said pipe means to an exterior of said pipe means, each adapted to direct said liquid substantially horizontally outwardly from said pipe means; and a containment vessel, to capture said liquid-gas mixture having microbubbles of gas entrained therein.

Importantly, however, and quite surprisingly, it has been further discovered that for an apparatus of the above design, that in the case of a pipe member that has a symmetric cross-sectional area and a uniform pipe wall thickness, and a maximum interior width Di and a maximum exterior width Do, a specific inter-relation need exist between the aperture exit area $A_e$ of the aperture(s), and the interior cross-sectional area $A_i$ of the pipe means, in order to achieve creation of microbubbles of the desired small size, namely in the range of 50–100 microns and preferably in the range of 5–50 microns.

Accordingly, in a highly preferred embodiment, where the aperture means consists of at least two apertures, the pipe means is symmetric and has substantially identical moments of intertia about two axis in a plane of cross-section through said pipe, wherein the combined aperture exit area $A_e$ of the apertures is a function of widths $D_i$ and $D_o$, namely $A_e$ is no greater than $A_i \times D_i / D_o$.

Where only a single aperture is used, it has been found that Ae must not be any greater than $A_i \times D_i / 2Do$.

While the above interrelation, namely for a plurality of apertures where $Ae \leq Ai \times Di / Do$ and for a single aperture $Ae \leq Ai \times Di / 2Do$, means it is possible to utilize apertures whose total combined cross-sectional area Ae is less than $Ai \times Di / Do$ or $Ai \times Di / 2Do$, typically, due to the desire to utilize an apparatus which utilizes the largest flow rate possible, it is usually greatly preferred that the greatest possible aperture exit area be used. Accordingly, more than one aperture will typically be desired to be used (thus the aperture exit area Ae may be twice as large than if only one aperture were used), and further that the aperture exit area Ae equal $Ai \times Di / Do$, as such will give the greatest "throughput" of liquid which can be provided with gas microbubbles over a given time.

Accordingly, in a highly preferred embodiment, the pipe means will possess more than one aperture, and the exit area of each of the apertures will be equal to $Ai \times Di / Do$.

In order for the above formula of $Ae \leq Ai \times Di / Do$ apply for pipe members having more than one aperture, it is necessary that the pipe member be not only symmetric in cross-section, but further it have substantially identical moments of inertia about two axis in a plane of cross-section through said pipe. This encompasses pipes having circular, square, hexagonal, octagonal and the like having uniform cross-sectional shape, but not to pipes having, for example, a rectangular cross-section. As more fully explained in this disclosure, for geometric cross-sectional areas which although symmetric but which do not have identical moments of inertia about at least two axis of a plane of cross-section, such as for rectangular pipe, such formula does not hold true, and other inter-relations may apply. However, in the case of rectangular pipe of uniform thickness, as is more fully explained below, it has been discovered that the required interrelation between exit areas of the apertures Ae, the dimensions of the pipe, and the cross-sectional area Ai of the pipe for microbubbles of the desired size to be produced be defined as:

$$Ae \leq A_i \times [D_3 + D_4] / [D_1 + D_2]$$

where $D_1$ is the major exterior side length, $D_2$ is the minor exterior side length, $D_3$ is the major interior side length, and $D_4$ is the minor interior side length However, as rectangular pipe is difficult to acquire, the more common application of this invention will be to pipe members having circular or square profiles which have identical moments of inertia about two or more axis in the plane of cross-section.

Accordingly, in a highly preferred embodiment, the pipe means of the present invention is of uniform wall thickness and has a maximum interior width $D_i$ and a maximum exterior width $D_o$, further having identical moments of inertia about at least two separate orthogonal axis in a cross-sectional plane through said pipe means; said apertures having a combined cross-sectional exit area $A_c$ defined as a function of widths $D_i$ and $D_o$ and said cross-sectional area $A_i$ of said pipe means, wherein $A_c$ is substantially equal to $A_i \times D_i/D_o$ It is highly preferred, although not absolutely necessary, that there be a vertical surface which created jets of gas/liquid mixture which exit from such apertures may impact against, in order to assist in the creation of microbubbles of gas within the liquid.

Accordingly, in a further refinement of the apparatus of the present invention, such apparatus further consists of substantially vertical surface means adapted to be impacted by said liquid when said liquid is directed horizontally outwardly from said pipe means by each of said apertures.

It is further preferred, although not absolutely necessary, that the collection vessel for containing the resultant liquid having microbubbles contained therein form part of an integral structure with the pipe means and together form a single containment vessel in which the pipe means is located. While there are a number of advantages to using an integral containment vessel having the pipe member therewithin as explained later within this specification, including the ability to create microbubbles within the gas/liquid mixture under an ambient gaseous pressure within such containment vessel, one particular advantage is that, if desired, and if the gas/liquid mixture in the pipe means is expelled from the apertures under sufficient pressure, the sides of the containment vessel may be used as the vertical surface against which the horizontal streams of gas/liquid which exit the apertures may be directed.

Accordingly, in a further broad embodiment of the present invention, the apparatus of the present invention comprises a vessel adapted to be positioned substantially vertically and adapted to contain a volume of gas in an upper portion thereof; means for introducing gas bubbles, the majority of which are of a size greater than 100 microns, into a liquid to form a liquid-gas mixture; elongate, hollow pipe means within said vessel of interior cross-sectional area $A_i$, for conveying said liquid when in a pressurized state to an interior of said vessel, substantially symmetrical in cross-section, situate centrally in said vessel and proximate said upper portion of said vessel and extending substantially vertically downwardly within said vessel from said upper portion thereof, and having plug means situate at a lowermost distal end thereof for preventing egress of liquid vertically downward from said distal end; and at least two apertures situate on said pipe means and disposed in one or more planes each substantially perpendicular to a longitudinal axis of said pipe means, extending from an interior of said pipe means to an exterior of said pipe means, each adapted to direct said liquid under pressure substantially horizontally outwardly from said pipe means.

Again, in a preferred embodiment, where symmetrical pipe means such as a cylindrical, square, hexagonal, octagonal, or even a triangular (equal sided) pipe member is used, the apparatus of the present invention comprises:

i) a containment vessel adapted to be positioned substantially vertically and adapted to contain a volume of gas in an upper portion thereof;

ii) elongate, hollow pipe means for providing said liquid to an interior of said vessel, having a longitudinal axis and substantially symmetrical in cross-section so as to have identical moments of inertia about at least two separate axis in a cross-sectional plane through said pipe means, of uniform wall thickness, and having a maximum interior width $D_i$ and a maximum exterior width $D_o$ and an interior cross-sectional area $A_i$, said pipe means situate substantially centrally in said vessel and proximate said upper portion of said vessel and extending substantially vertically downwardly within said vessel, adapted for supplying a pressurized liquid to an interior of said vessel, and having plug means situate at a distal end thereof for preventing egress of liquid vertically downward from said distal end;

iii) at least two apertures situate in said pipe means and disposed in one or more planes each substantially perpendicular to a longitudinal axis of said pipe means, each extending from an interior of said pipe means to an exterior of said pipe means, each adapted to direct said liquid substantially horizontally outwardly from said pipe means, of combined cross-sectional exit area $A_c$; and iv) said combined aperture exit area $A_c$ of said apertures, defined as a function of widths $D_i$ and $D_o$ and said cross-sectional area $A_i$ of said pipe means, wherein $A_c$ is no greater than, and preferably equal to, $A_i \times D_i/D_o$.

The aperture(s) may be of any geometric shape in cross section, such as circular (ie cylindrical apertures), provided the exit area of such aperture(s) in such pipe member meets the requirement for exit area Ae as discussed above in order to create microbubbles of a size in the range of 50 to 100 microns, and preferably 5–50 microns. In particular, the apertures may be one or more narrow horizontally-extending rectangular slots, or alternatively one or more vertical slots in such pipe member, all of which are easy to manufacture, either by drilling in the case of cylindrical apertures, or cutting/milling in the case of vertical or horizontal slots.

Importantly, it has further been discovered that apertures in the pipe member of a maximum dimension in excess of a certain amount may not form microbubbles of the required small size (5–50 microns).

In particular, the maximum gap "G", namely the maximum cross-sectional dimension that the aperture may possess is a function of the inner cross-sectional area of the pipe member divided by the outer circumference of the pipe member.

Accordingly, in such cases, where the aperture(s) are of a horizontally extending rectangular slot, of vertical depth G, where the pipe member has an exterior circumference C, G should preferably be no greater than Ai/C in order to form microbubbles when said liquid-gas mixture is expelled from the pipe member via such aperture(s).

Likewise, where the aperture(s) are of a circular cross-section (ie cylindrical), the diameter of such aperture should preferably be no greater than Ai/C.

Again, it is possible to utilize apertures of maximum dimension (or diameter, as the case may be) less than Ai/C, and still create gas microbubbles of the desired size of 5–100 microns. Accordingly, a large number of small apertures, where the total combined aperture area Ae adds up to the maximum aperture area [Ai×Di/Do] may be used, in order to introduce microbubbles in as great a quantity of liquid over a given time. However, having to drill large numbers of small apertures adds to the cost and time in the manufacture of the pipe member and thus of the apparatus of the present invention. It is much less expensive and less time-consuming to drill/mill as few a number of apertures as possible (see discussion below as to what the minimum number of apertures may be for a circular pipe).

The above relationship for the aperture exit area $A_c$ is derived from the surprising observation that the maximum aperture dimension (i.e. the "gap") through which the gas/liquid mixture must pass is determined from the experimentally-derived observation that the aperture dimension, hereinafter referred to as the "gap", which best creates microbubbles of the desired small size, is determined by the relationship gap "G"=$A_i$/(pipe outer circumference).

For example, for a circular conduit/pipe of minor diameter $D_i$, outer diameter $D_o$, and cross-sectional area $Ai=\pi D_i^2/4$ it has been found that for a rectangular aperture cut perpendicularly into the side of the pipe, to a depth of ½ the pipe diameter, so as to create an aperture to allow egress of a gas/liquid mixture under pressure therethrough, the maximum permissible "gap" G, namely the maximum vertical height of such horizontal slot, is:

$A_i$/(pipe outer circumference)=$\pi D_i^2/(4\_\pi D_o)=D_i^2/4D_o$     (Eq'n. #1)

The surface exit area Ae of two slots each formed over ½ the inner diameter of the pipe $D_i$ is calculated as follows:

$A_c=2\times gap \times \frac{1}{2}\pi \times D_i$

Thus the maximum exit area $A_c$ of such apertures for a circular pipe member is thus equal to:

$Ae=2\times D_i^2/4D_o \times \frac{1}{2}\pi \times D_i=\pi D_i^3/4D_o$.     (Eq'n. # 2)

Accordingly, Ae stated more generally in terms of $A_i$, where $Ai=\pi D_i^2/4$ may be stated as follows:

$$A_c = \frac{\pi Di^3}{4Do} = \frac{\pi Di^2}{4} \times D_i/D_o = Ai \times Di/Do$$

Where only one exit aperture is utilized, maximum exit area is $=\pi D_i^3/8D_o$, and stated in terms of Ai is equal to:

$Ai \times Di/(2Do)$

In view of the above, the minimum number of apertures in a circular pipe may be determined. In this regard, in a preferred embodiment of the apparatus of the present invention, for the reasons discussed above, namely the desire to use the greatest amount of "throughput" for the apparatus with the least number of holes/apertures, and thus introduce microbubbles into the greatest volume of liquid in the shortest time, the largest-sized aperture utilizable equals Ai/C. In order to achieve as much throughput of liquid which has microbubbles introduced therein, the apparatus in a preferred embodiment will not only possess apertures of maximum size, but also the combined exit area Ae of such apertures will equal the maximum permissible area in order that the apparatus be able to process (ie introduce gas microbubbles) into as much liquid as possible for a given time.

Accordingly, in the case of cylindrical pipe, having circular (cylindrical) apertures, the minimum number of holes (apertures) which can be used is determined by reference to Eq'n. #2, which defines the maximum exit area for a circular pipe member, namely:

$Ae=\pi D_i^3/4D_o$

Although the surface exit area of a circular hole in a cylindrical pipe forms a "saddle-like" exit area on the surface of the pipe, for small diameter apertures relative to the diameter of the pipe, the combined surface exit area of all apertures is approximately equal to the number of apertures multiplied by the exit area $A_{aperture}$ of each aperture:

$Ae(\max)=n \times A_{aperture(max)}=n \times (\pi \times Da^2/4)$

As discussed, Da is preferably no greater than Ai/C. Accordingly, substituting Ai/C for Da produces the following:

$$Ae(\max) = n \times (\pi \times Da^2/4)$$
$$= n \times (\pi \times [Ai/C]^2/4)$$
$$= n \times (\pi \times [(\pi \times Di^2/4)/(\pi \times Do)]^2/4$$

The above equation for Ae(max) can be equated to Eq'n. # 2 for the Ae(max) of a circular pipe, and solved for "n" as follows:

$$Ae(\max) = n \times (\pi \times [(\pi \times Di^2/4)/(\pi \times Do)]^2/4 = \pi D_i^3/4D_o \quad \text{(Eq'n. 6)}$$
$$n = 16\frac{Do}{Di}$$

Accordingly, since Eqn. 6 may, depending on the ratio of Do/Di, produce a fractional value for the number of holes "n", in a preferred embodiment, the minimum number of circular apertures in a circular pipe member for maximum flow of liquid is defined by the following expression, namely:

$n$=nearest whole integer to $[16 \times D_o/D_i]$     (Eq'n. 6A).

It is noted that since the maximum combined aperture exit area Ae for cylindrical pipe is $Ai \times Di/Do$, for apertures of small diameter $D_A$ relative to the diameter of the cylindrical pipe, the following is true:

$Ae_{max}=n\times \pi D_{A(Max)}^2/4$ and thus $Ai \times Di/Do=n\times \pi D_{A(Max)}/4$ The above allows us to solve for the maximum diameter of the apertures $D_{A(max)}$, where for circular pipe, $$Ai = \frac{\pi Di^2}{4}$$

follows:

$\pi \times Di^2/4 \times Di/Do==n \times \pi \times D_{A(Max)}^2/4$ thus $D_{A(MAX)}=\sqrt{Di^3/[n \times Do]}$ stated alternatively, $D_{A(MAX)}=\sqrt{4 \times Ai \times Di/[n \pi \times Do]}$ It is usually the case for most cylindrical pipe having diameters Di and Do that "n" must be greater than 2 for most pipe, namely there must usually be a plurality of apertures, since otherwise the calculated diameter $D_A$ results in a diameter greater than both the interior diameter Di and the exterior diameter Do, which is a physical impossibility, as diameter $D_A$ can only be as large as, or smaller than, Di and Do.

The above value $D_{A(MAX)}$ for a circular pipe having cylindrical apertures may, in instances where there are relatively few number of apertures (ie n is a low number, but greater than one as per the above) give values of $D_A$ which are higher than Ai/(outer circumference of pipe) and which are too high and which will generally not produce microbubbles of desired size (ie less than 50 microns). Accordingly, the two criteria which are preferably satisfied in order to form microbubbles of the desired size are that Ae(max)=Ai×Di/Do, and $D_{A(MAX)} \leq$ Ai/(Circumference of Pipe).

For a square conduit of inner dimension $D_i$ and outer dimension $D_o$, having inner flow area $A_i = D_i^2$ and outer circumference 4 Do, for a horizontally extending slot of Gap "G", it has been found that the maximum gap is likewise the flow area through the pipe Ai divided by the exterior circumference of the (square) pipe, being 4Do. Accordingly, the maximum vertical slot depth "G" for a square pipe may be stated as follows:

$$\text{Gap "G"(Max)} = \frac{A_i}{\text{circumference}} = \frac{D_i^2}{4D_o}$$

The exit area $A_c$ for a plurality apertures in a square pipe may thus be calculated, knowing such maximum Gap "G". Accordingly, where the apertures comprise a pair of rectangular slots of vertical depth equal to the above Gap (Max), the exit area Ae for the apertures may be calculated as:

$$A_c = 2 \times \text{Gap(max)} \times (\tfrac{1}{2}D_i + D_i + \tfrac{1}{2}D_i)$$

Accordingly, expressed in terms of inlet area Ai for the square pipe, Ae may be stated as follows:

$$A_c = 2 \times \frac{D_i^2}{4D_o} \times (2D_i) = \frac{4D_i^3}{4D_o} = D_i^2 \times \frac{D_i}{D_o} = Ai \times Di/Do$$

Again, where there is only one aperture in such square pipe, Ae is thus:

$$A_c = \text{Gap(max)} \times (\tfrac{1}{2}D_i + D_i + \tfrac{1}{2}D_i)$$

and thus, expressed in terms of Ai, is thus:

$$Ae = Ai \times Di/(2 \times Do)$$

As in the case of circular apertures in circular pipe, where there are circular apertures in square pipe, the diameter $D_{A(MAX)}$ may be solved for as follows:

$$Ae = Ai \times Di/Do \quad (1)$$

$$Ae = n \times \pi \times D_a^2/4 \quad (2)$$

where 'n' is the number of apertures Equating (1) with (2) allows for the diameter DA(Max) to be solved for as follows:

$$Ai \times Di/Do = n \times \pi \times D_a^2/4$$

$$D_{A(MAX)} = \sqrt{4 \times Di^3/[n \times \pi \times Do]} = \sqrt{4 \times Ai \times Di/[n \times \pi \times Do]}$$

Again, it is usually the case for most square pipe having interior width Di and exterior width Do that "n" must be greater than 2 for most pipe, namely there must usually be a plurality of apertures, since otherwise the calculated diameter DA of the cylindrical aperture results in a diameter greater than either the interior width Di or the exterior width Do, which is a physical impossibility, as diameter $D_A$ can only be as large as, or smaller than, Di and Do.

Again, the above value $D_{A(MAX)}$ for a square pipe having cylindrical apertures may, in instances where there are relatively few number of apertures (ie n is a low number, but as per the above, greater than one) give values of $D_A$ which are higher than Ai/(outer circumference of pipe) and which are too high and which will generally not produce microbubbles of desired size (ie less than 50 microns). Accordingly, the two criteria which are preferably satisfied in order to form microbubbles of the desired size are that Ae(max)=Ai×Di/Do, and $D_{A(MAX)}$=Ai/(Circumference of Pipe).

It has been discovered that the above relationship(s) hold true for any pipe of symmetrical cross-sectional area and having at identical moments of inertia about at least two axis in a plane of cross-section through such pipe.

For example, for a triangular pipe member (of equal interior side length Di and equal exterior side length Do so as to be symmetrical and have identical moments of inertia about at least two axis in a plane of cross-section through such pipe member), the interior cross-sectional area Ai of such pipe member of interior side length Di is:

$$Ai = \frac{\sqrt{3}}{4} Di^2$$

For two identical horizontal slots (apertures) cut into such pipe to form a "gap" of vertical height "G", where such slots to a depth so as to provide access to one-half of the interior area Ai of such pipe member, the maximum gap (ie vertical depth of each slot) is again determined by the relationship:

$$\text{Gap(Max)} = Ai/\text{pipe outer circumference} = Ai/3Do = \frac{\sqrt{3}}{12Do} Di^2$$

The exit area of such two apertures is accordingly determined as the product of the gap multiplied by the perimeter of the gap. Accordingly, $$Ae(\text{max}) = 2 \times \text{gap} \times \left(Di + \frac{1}{2}Di\right)$$
$$= 2 \times \frac{\sqrt{3}}{12Do} Di^2 \times \frac{3}{2} Di$$
$$= \frac{\sqrt{3}}{4} \frac{Di^3}{Do}$$

Expressed in terms of Ai, $$Ae(\text{max}) = \frac{\sqrt{3}}{4} Di^2 \times \frac{Di}{Do} = Ai \times \frac{Di}{Do}$$

The present invention, in a further of its broad aspects, relates to a method for creating microbubbles of gas in a liquid and exposing them to matter entrained in said liquid. Accordingly, in one broad aspect of the method of the present invention, such method comprises the steps of:

providing gas to said liquid to form a gas/liquid mixture;

directing said gas-liquid mixture into a hollow pipe member, said pipe member having a maximum interior width $D_i$ and a maximum exterior width $D_o$, said pipe member situate proximate an upper portion of a containment vessel and extending into an interior of said containment vessel, said upper portion of said containment vessel containing said gas being under pressure, and a bottom portion of said containment vessel substantially containing said liquid;

injecting said gas-liquid mixture under pressure via said pipe member, into said containment vessel;

spraying substantially radially outwardly from said pipe member said gas-liquid mixture into said upper portion of said containment vessel via at least two apertures in said pipe member;

said at least two apertures in said pipe member in communication with said gas-liquid mixture in said pipe member and having a combined area $A_c$ sized as a function of a maximum interior widths $D_i$ and maximum outside width $D_o$ and a cross-sectional area $A_i$ of said pipe member, wherein $A_c$ is substantially equal to:

$$A_i \times D_i / D_o$$

and removing from said bottom portion of said containment vessel said liquid which has been exposed to said microbubbles.

In yet another aspect of the method of the present invention, such method comprises a method for converting a liquid-gas mixture having bubbles of gas therein the majority of which are greater than 5–100 microns in size to a liquid-gas mixture having microbubbles of gas therein the majority of which are of a size between 5–100, comprising the steps of:

directing said gas-liquid mixture having bubbles of gas therein the majority of which are greater than 5–100 microns in size into a hollow, substantially vertical pipe member, having a maximum interior width $D_i$ and a maximum exterior width $D_o$;

spraying said gas-liquid mixture substantially radially outwardly from said pipe member via a plurality of apertures in said pipe member, so that said gas-liquid mixture contacts a vertically extending surface;

said plurality of apertures in said pipe member in communication with said gas-liquid mixture in said pipe member and having a combined area $A_c$, said apertures sized as a function of said maximum interior width $D_i$ and said maximum outside width $D_o$ and a cross-sectional area $A_i$ of said pipe member, wherein $A_c$ is no greater than, and preferably equal to:

$$A_i \times D_i / D_o$$

collecting a resulting gas-liquid mixture having microbubbles of gas entrained therein in a vessel; and removing said gas-liquid mixture from said vessel In a further refinement of the methods of the present invention, one such method further comprises the step of collecting within said bottom portion of said vessel said liquid with microbubbles entrained therein and withdrawing said liquid from said bottom of said vessel at a rate approximately equal to a rate at which said liquid is introduced into said containment vessel.

In yet a further refinement of the aforesaid methods, the rate of withdrawing the liquid from the bottom of the vessel is substantially at a rate which microbubbles entrained in said liquid rise in the vessel, so that at a time when liquid is removed from said bottom of said vessel said microbubbles will have travelled upwardly a distance through said liquid equal to a depth of liquid in the bottom of the vessel.

In yet a further aspect of the method of the present invention, the liquid-gas mixture sprayed from said pipe member may be passed through a baffle plate member positioned in the containment vessel below said pipe member and intermediate said upper portion and said bottom portion of said containment vessel, and the rate of injection and removal of gas-liquid from the vessel adjusted so that baffle plate member is positioned above the level of the liquid in the vessel.

In order for the apparatus and method of the present invention to form microbubbles, the pressure of the gas in the upper portion of the vessel (back pressure) need be of a pressure of at least 10 psig to 15 psig, and preferably at least 20 psig to 30 psig. The initial-gas liquid mixture, in order to be provided to the apertures and sprayed therefrom, must necessarily, due to a small pressure drop across the apertures, be supplied at a slightly higher pressure than the pressure of the gas within the upper portion of the vessel (i.e. back pressure), in order to be effectively sprayed into the interior of the vessel. The step of spraying the liquid-gas mixture substantially radially outwardly via the apertures may further in a preferred embodiment be adapted to spray such liquid-gas mixture against the sides of the containment vessel.

From another perspective, the invention in a preferred embodiment comprises a method for continuously purifying a liquid containing impurities by exposing the liquid and impurities for a time in a substantially vertically containment vessel to microbubbles in the range of 5–100 microns in diameter, comprising the steps of:

directing a gas-liquid mixture containing impurities and bubbles of gas the majority of which are in excess of 100 microns in diameter into a hollow pipe member, said pipe member of uniform thickness and having a maximum interior width Di and a maximum exterior width Do and identical moments of inertia on two axis in a plane of cross-section through said pipe means, said pipe means situate proximate an upper portion of said containment vessel and extending vertically downwardly in an interior of said containment vessel, said upper portion of said containment vessel containing said gas, and being under pressure of at least 10 psig and preferably 15 psig or higher;

injecting said gas-liquid mixture, under a pressure of at least 5 psig higher than said gas in said containment vessel, into said vessel via said pipe member;

spraying said gas-liquid mixture substantially horizontally outwardly from said pipe member into said upper portion of said containment vessel via a plurality of apertures in said pipe member so that said gas-liquid mixture contacts interior sides of said vessel;

said plurality of apertures in said pipe member in communication with said gas-liquid mixture in said pipe member and having a combined area $A_c$, said apertures sized as a function of said maximum interior width $D_i$ and said maximum outside width $D_o$ and a cross-sectional area $A_i$ of said pipe member, wherein $A_c$ is no greater than:

$$A_i \times D_i / D_o$$

collecting said gas-liquid mixture, now having microbubbles of gas entrained therein the majority of which are now of a size less than 100 microns in diameter, in a bottom portion of said containment vessel;

removing, from said bottom portion of said vessel, said liquid with gas microbubbles entrained therein at a rate which said microbubbles entrained in said liquid rise in said vessel so as to permit said gas microbubbles time to react with impurities in said liquid; and supplying said liquid-gas mixture to said pipe member substantially at a rate at which said liquid-gas mixture having gas microbubbles entrained therein is removed from the bottom of said vessel.

Advantageously, the present invention in a particular refinement of both of one of the method and apparatus of the present invention, makes use of a sorting phenomenon in order to obtain microbubbles of the desired size.

Specifically, in a particular embodiment where a gas-liquid mixture having gas bubbles of substantially large size (>100 microns) entrained therein is sprayed outwardly from a pipe member and captured in a containment vessel, liquid having some large (>100 microns) as well as small (<100 micron) gas bubbles (but preferably a preponderance of small gas bubbles) is collected in said vessel. However, gas bubbles in said liquid which fall vertically down in said vessel when expelled from said aperture tend to fall to various depths in said containment vessel, before starting to rise in such vessel, depending on the size of the gas bubble entrained in surrounding liquid. Specifically, larger gas bubbles within the liquid tend to fall a lesser distance downwardly in liquid collecting at a bottom portion of the containment/collection vessel than smaller gas bubbles.

Accordingly, by proper vertical positioning of a liquid-withdrawal tube from the containment vessel this "sorting" of bubbles within the liquid collecting in the bottom portion of the vessel can be taken into account in obtaining liquid having gas bubbles of the lesser (more desirable) smaller diameter. Specifically, positioning of such withdrawal tube on such vessel at a position somewhat above a lowermost portion of said vessel and immediately below a lowermost level in said vessel which bubbles of a size larger than 100 microns initially fall to before rising in said vessel, and at a level within said bottom portion of said vessel which bubbles of a size less than 100 microns initially fall to before rising in said vessel, will allow the withdrawal tube to withdraw from said vessel only a gas-liquid mixture having smaller (ie <100 micron) bubbles.

Accordingly, in a preferred method of the present invention taking advantage of the above "sorting" principle in order to obtain gas microbubbles of a size less than 100 microns, such method comprises a method for producing a liquid having gas microbubbles therein the majority of which are of a size less than 100 microns, comprising the steps of:

providing gas to said liquid to form a gas/liquid mixture;

directing said gas-liquid mixture into a hollow pipe member, said pipe member having a maximum interior width $D_i$ and a maximum exterior width $D_o$, said pipe member situate proximate an upper portion of a containment vessel and extending into an interior of said containment vessel, said upper portion of said containment vessel containing said gas being under pressure, and a bottom portion of said containment vessel substantially containing said liquid;

spraying substantially radially outwardly from said pipe member said gas-liquid mixture into said upper portion of said containment vessel via at least two apertures in said pipe member;

and removing from said bottom portion of said containment vessel, at a position somewhat above a lowermost portion of said vessel, said gas-liquid mixture;

said position being a position immediately below a lowermost level in said vessel which bubbles of a size larger than 100 microns initially fall to before rising in said vessel, and at a level within said bottom portion of said vessel which bubbles of a size less than 100 microns initially fall to before rising in said vessel In a further embodiment the invention consists of an apparatus for making use of the "sorting" phenomenon.

Accordingly, in such refinement of the apparatus of the present invention, the containment vessel of the present invention comprises gas-liquid withdrawal means, such withdrawal means in communication with an interior of the vessel proximate a bottom portion thereof, vessel, adapted to withdraw a gas-liquid mixture having microbubbles of entrained gas therein from said interior of such vessel, such withdrawal means situate on said vessel at a position, said position being at a level on said vessel below a lowermost level within said vessel which bubbles of a size larger than 100 microns fall to before rising in liquid in said vessel, and at a level which bubbles of a size less than 100 microns fall to before rising in said vessel.

BRIEF DESCRIPTION OF THE DRAWINGS

The following drawings, showing selected embodiments of the invention, are non-limiting and illustrative only. For, a complete definition of the scope of the invention, reference is to be had to the summary of the invention and the claims.

FIG. 3 is an enlarged perspective view of items 24 and 25, area "B" of FIG. 2, showing in a particular embodiment of the invention wherein item 24 (pipe member) is cylindrical having circular apertures 32 therein;

FIG. 4 is a view of an alternative embodiment of the present invention, similar to that shown in FIG. 1, showing utilization of an inclined but substantially vertical baffle member;

FIG. 9 is a side view similar to FIG. 1 showing another embodiment of the apparatus of the present invention, wherein the apertures for forming the microbubbles are situate in a plug member which is itself situated at the extreme lowermost distal end of the plug member;

FIG. 10 is an enlarged view of area "A" of FIG. 9;

FIG. 11 is yet a further side view similar to FIGS. 1 and 9, showing yet another embodiment of the apparatus of the present invention, in this case having circular apertures situate in the plug member at the extreme lowermost end of the pipe member;

FIG. 12 is an enlarged view of area "A" of FIG. 11;

FIG. 14 is a cross-sectional view of a particular embodiment of the apparatus of the present invention which was selected to conduct tests on;

FIG. 16 is a table setting out test data obtained using the test apparatus of FIGS. 14 and 15.

DETAILED DESCRIPTION OF THE INVENTION

Figure 1:
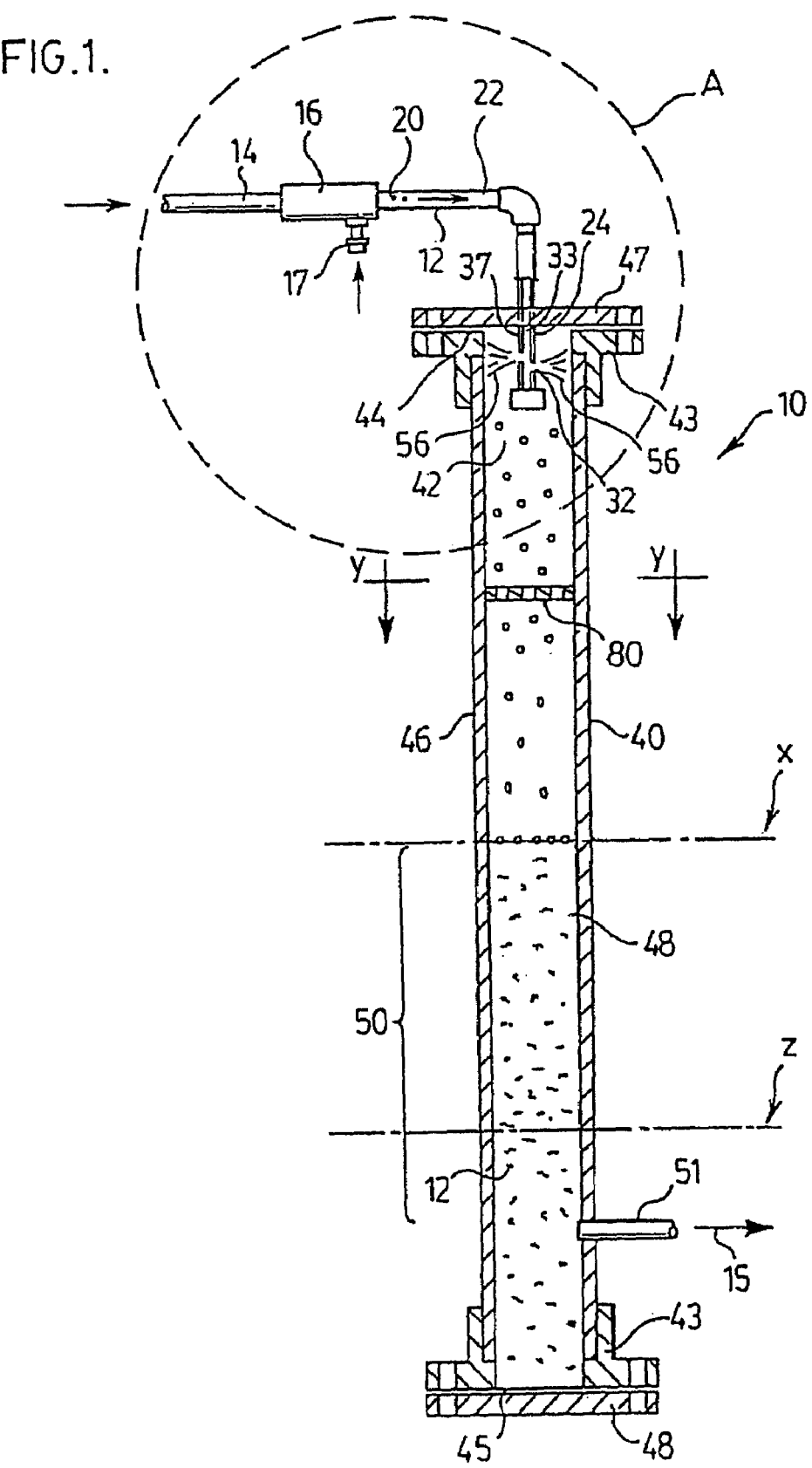
FIG. 1 shows a front view of one embodiment of the apparatus of the present invention for creating microbubbles of gas, said apparatus in the embodiment shown using a cylindrical pipe member and a plurality of horizontally-extending cylindrical apertures.

FIG. 1 shows one embodiment of the apparatus 10 of the present invention for producing microbubbles 12 in a liquid 14.

A means 16 for introducing gas bubbles 20 into such liquid 14 flowing in pipe 9 is provided. Means 16 may be a venturi, namely a converging-diverging nozzle, as known in the art, having at the converging portion an aperture 17 through which gas, typically although not always air, is drawn and flows in the form of bubbles 20 into the liquid, to form a gas-liquid mixture 22. Alternatively, and more typically, means 16 is simply an orifice to permit the injection of gas under pressure into said liquid 14 in pipe member 12, resulting in formation of gas bubbles 20 within liquid 14, which is under a resulting pressure.

The supply of gas may be from ambient air, if air is the desired gas to be introduced, as shown in FIG. 1, or alternatively may be from a pressurized tank of gas (not shown), if some other form of gas (such as $H_2$ or $CO_2$) is desired to be introduced.

Gas bubbles 20 entrained in such gas-liquid mixture 22 in the above manner are typically of a size greater than 100 microns, or at least a majority of gas bubbles 20 entrained in such gas-liquid mixture 22 are of a size greater than 100 microns, at typical ambient temperature and pressure (22° C. and 1 atmosphere).

One of the purposes of the apparatus 10 of the present invention is to reduce the bubble size of the gas bubbles 20 within the gas-liquid mixture 22 to a size less than 100 microns, and preferably to a size in the range of 5–50 microns, in order to increase the ability of the gas in the gas-liquid mixture 22 to react with materials or substances entrained in the gas-liquid mixture 22, for the purposes of purifying and/or causing certain entrained substances in such liquid 14 to precipitate out of such gas-liquid mixture 22, thereby ridding such liquid 14 of such substances.

The gas-liquid mixture 22, having gas bubbles 20 therein the majority of which are of a size greater than 100 microns, is thereafter conveyed typically by means of a hollow pipe or conduit 24 to an elongate, hollow pipe member 24, typically although not necessarily, situate within a containment vessel 40, as shown in FIG. 1.

Pipe member 24 contains aperture means consisting of a one or more apertures 32, extending from an interior 33 of such pipe member 24 to an exterior 37 of pipe member 24 (see enlarged view of one embodiment of pipe member 24 shown in FIG. 3, wherein pipe member 24 is cylindrical in cross-section, having a plurality of cylindrical apertures therein). Each of apertures 32 may be of any geometric shape, but preferably are of a cylindrical shape as shown in FIG. 3, a cylindrical aperture being the resultant shape that results from drilling of such aperture 32 during manufacture using a circular drill bit, drilling being one of the easiest means of forming such apertures 32. Each of said apertures 32 extend horizontally outwardly and substantially perpendicular to a longitudinal axis of the pipe member 24. Pipe member 24 is positioned substantially vertically, as shown in FIG. 1, and is adapted to receive the liquid-gas mixture 22 and supply same under pressure to apertures 32. Each of apertures 32 extend horizontally outwardly from interior 33 of pipe member 24 to exterior 37 of pipe member 24. Pipe member 24 further possesses a plug member 25, situate at a lowermost distal end thereof for preventing egress of liquid-gas mixture 22 from said pipe member 24.

As hereinafter explained, the size (both width and cross-sectional area) of such apertures 32 is dependent in a preferred embodiment on certain formulae which are preferably maintained to allow formation of microbubbles 12 of a desired size, namely less than 100 microns, and preferably 5–50 microns, when the gas-liquid mixture 22 is expelled under pressure from the pipe member 24 via apertures 32.

A containment vessel 40 is further provided. In a preferred embodiment, containment vessel 40 is an elongate, vertically-extending column, configured so as to receive therewithin pipe member 24 in an upper portion 42 thereof. Specifically, in the embodiment shown in FIG. 1, containment vessel 40 is formed of a vertical conduit 46, having threaded flange members 43 affixed [in the preferred embodiment by welding for conduits of weldable metallic material and where such conduits are of a plastic material such as polyvinyl chloride (PVC), by an adhesive or a bonding agent such chloroform] at each of a bottom and top end 44,45 respectively. Flanges 41,43 are adapted to receive plate members 47,48 at each of said top and bottom ends 44,45 which may be bolted to flange members 43 respectively by means of bolts 57, with an intervening gasket 59, so as to form an enclosed vessel 40.

The purpose of vessel 40 is to receive and contain for a time liquid 14 expelled from said apertures 32 at a given level "x" within said vessel 40. The resulting microbubbles 12 produced in the gas-liquid mixture 22 which fall from apertures 22 into vessel 40 may react in the bottom portion 48 of vessel 40 with substances within the liquid 14, so as to cause impurities to precipitate out. The remaining (purified) liquid 15 may then be removed from vessel 40 via a lower liquid withdrawal pipe 51.

Alternatively, or in addition, the vertical length 50 of the bottom portion 48 of vessel 40 may act as a stratification column and take advantage of a "sorting" with respect to gas bubbles. In this regard, any remaining gas bubbles 14 of a relatively large size (ie in excess of 100 microns in size) which may still be entrained in said gas-liquid mixture 22 along with smaller gas bubbles after the expulsion of the gas-liquid mixture from apertures 32 will tend to fall into bottom portion 48 of vessel 40. However, larger gas bubbles tend to fall to or above a level (namely above line "X" as shown in FIG. 1) before beginning to rise in the liquid column contained in the bottom portion of vessel 40. On the other hand, smaller sized gas bubbles tend to fall to a level "Z" or below such level "Z" before beginning to rise within such liquid, as shown in FIG. 1.

Accordingly, by positioning withdrawal pipe 51 at a level below a level "Z" to which the majority of larger gas bubbles fall, only liquid 15 substantially having gas bubbles of a size less than 100 microns may be obtained when withdrawn from withdrawal tube 51. Such liquid 14, having a majority of gas bubbles therein of a size less than 100 microns, may then be transported via withdrawal pipe 51 to a further containment vessel 52 (not shown) where such gas microbubbles entrained in the liquid 14 may then react (or further react) with substances within such liquid 15, such as iron bacteria or other undesirable substances, so as to render such substances harmless or cause them to precipitate out of solution, leaving a purified liquid 15.

Although it is not necessary that vessel 40 be an enclosed vessel, in the preferred embodiment it is desirable that vessel 40 be an enclosed vessel, as shown in FIG. 1. This allows two advantages to be realized.

Figure 2:
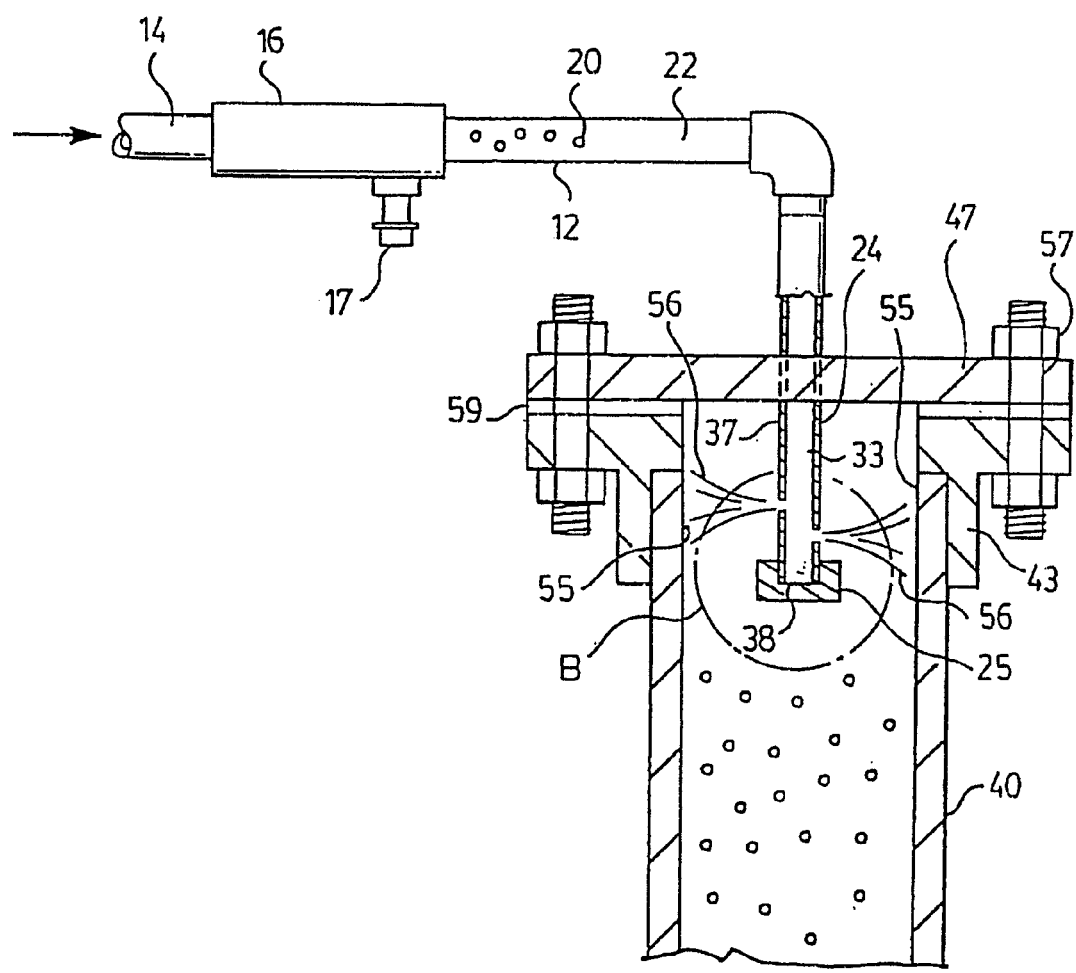
FIG. 2 is an enlarged view of area "A" of FIG. 1.

Firstly, to improve the formation of gas microbubbles upon the liquid-gas mixture 22 being expelled from aperture means within pipe member 24, the side walls 55 of an enclosed vessel 40 may be used, where the pressure in pipe member 24 is sufficiently high, as a vertical surface against which resulting jets 56 of gas-liquid may impinge against prior to falling from upper portion 42 of vessel 40 to bottom portion 48 of vessel 40. A depiction of this preferred embodiment is shown in enlarged view in FIG. 2. The impaction of the jets 56 of gas liquid against side walls 55 tends to cause larger gas bubbles entrained in liquid 14 to break into microbubbles, thus aiding the formation of gas microbubbles.

Secondly, the utilization of an enclosed vessel 40 assists in maintenance of gas microbubbles within liquid 14 in the bottom portion 48 of vessel 40, as the vessel 40 may be maintained under a relative pressure. In this regard, in a preferred embodiment, the internal relative pressure in the upper portion 42 of vessel 40 is in the range of 25 psig or above, with the pressure of the gas-liquid mixture 22 in pipe member 24 being in the range of 5 psig or higher than the internal relative pressure within vessel 40, to permit the gas-liquid mixture 22 within such pipe member 24 to be expelled into upper portion 42 of vessel 40 via apertures 32. The maintenance of a pressure within vessel 40 less than the supplied pressure within pipe member 24 assists in formation of gas bubbles in liquid 14. The maintenance of a pressure within such vessel 40 higher than ambient assists in maintaining bubbles of a small size within the bottom portion of the vessel 40, which is useful if the sorting feature described above is not desired to be used and instead the bottom portion of vessel 40 is used as a type of containment vessel to allow reaction of the gas microbubbles with substances within liquid 14, as further explained below.

The embodiment of the apparatus and the method of the present invention where the "sorting" of bubbles according to size is employed and the withdrawal pipe 51 is situated at a level below level "Z" to withdraw only those gas bubbles the majority of which have a size less than 100 microns, is particularly suited to a continuous as opposed to a batch process. Specifically, because the liquid which is withdrawn from withdrawal pipe 51 is substantially comprised of microbubbles, liquid 14 having such microbubbles entrained therein may be continuously withdrawn from vessel 40 for subsequent processing in a reaction vessel (not shown) elsewhere.

Where the bottom portion 48 of vessel 40 is itself used as a reaction vessel to allow the microbubbles therein to react with substances in such liquid 14, either a "batch" or a "continuous" process may be employed. Specifically, where a batch process is employed, sufficient gas-liquid mixture 22 is discharged through apertures 32 to allow the liquid-gas mixture 22 to rise in vessel 40 to a level "x" approximately one-half to two-thirds the height of vessel 40. A period of time is allowed to pass, namely the period of time which it takes for microbubbles of a size less than 100 microns to rise from a level at or below level "Z" (see FIG. 3) to level "X". Thereafter the liquid 15 may be withdrawn from vessel 40 by withdrawal pipe 51 at a position on such vessel anywhere intermediate level x and the base of the vessel 40, and preferably at a level close to level "Z".

Where a continuous process of treating liquid 14 in containment vessel 40 is desired to be employed, liquid 14 in the liquid-gas mixture 22 is supplied to the vessel 40 via pipe member 24 at a rate approximately equal to a rate at which the liquid 15 is withdrawn from vessel 40 via withdrawal pipe 51. In addition, the rate of withdrawal of liquid 15 (and the rate of supply of liquid 14) is adjusted so that at a time when liquid is removed from said bottom portion 48 of vessel 40 the microbubbles will have travelled upwardly a distance through liquid 14 substantially equal to a majority of the depth of liquid 14 in said bottom portion of said vessel, namely from approximately level "z" to approximately level "x". In order to facilitate the removal of liquid 15 which has been exposed to microbubbles for such period of time, a vertical baffle plate member 60 may be employed as shown in FIG. 4 to direct the flow of liquid having microbubbles entrained therein as shown in FIG. 4. In such embodiment withdrawal tube 51 is preferably situate close to, but below level "X", and withdraws liquid 15 which has been exposed to gas microbubbles for the time that it takes such microbubbles after having fallen from level "x" to level "z" on a first side 70 of such baffle member 60 to rise on the other side 71 of baffle member 60 from level "Z" to level "X".

Figure 13:
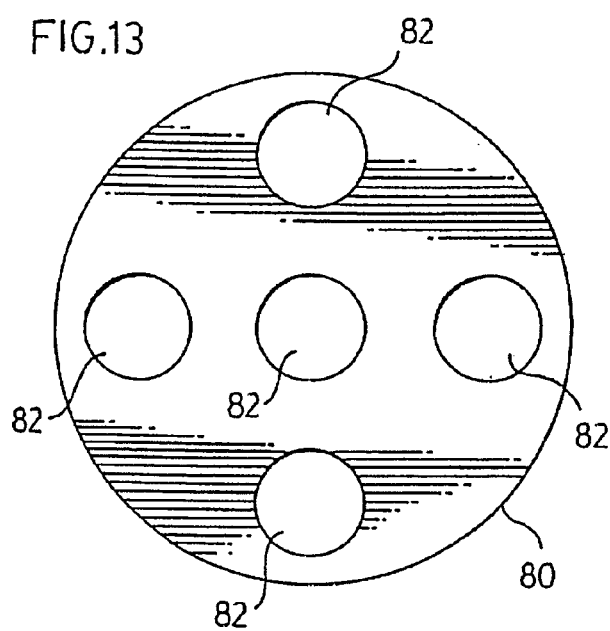
FIG. 13 is an enlarged view of the baffle plate member shown in FIGS. 1, 9, and 11.

In a further embodiment, the apparatus 10 of the present invention further includes a horizontal baffle plate member 80 (ref. FIG. 1 and FIG. 4), positioned intermediate upper portion 42 and bottom portion 48 of vessel 40, and above level "x" of liquid 14 in the vessel 40, so that gas-liquid mixture sprayed from pipe member 24 is permitted to pass through such baffle member 80 when falling to bottom portion 48 of vessel 40. Baffle plate member 80 is provided with a series of orifices 82 (see FIG. 13 showing enlarged view of horizontal baffle member 80) to permit gas-liquid mixture 22 to further fall to bottom portion 48 of vessel 40. Baffle plate member 80 further assists in converting gas bubbles 20 in gas-liquid mixture 22 to microbubbles.

Pipe member 24 having one or more apertures 32 therein may be any hollow elongate tubular member, substantially symmetrical in cross-section. FIGS. 5, 6, 7, and 8 show four separate embodiments, where such pipe member 24 is alternatively of, but not limited to, having a circular, square, triangular, and rectangular cross-sectional area respectively In order for the apertures to best form microbubbles, in a preferred embodiment a specific mathematical relationship exists between the interior area of the pipe member 24, and the combined exit area Ae of apertures 32, where such pipe member 24 has a maximum exterior width Do and maximum interior width Di. Such relationship between the combined exit area Ae of the apertures 32 and the inlet area Ai of the pipe member 24 is essentially a function of the thickness of the pipe member (namely the ratio of Di to Do), and is a definite relationship for symmetrical pipe members 24 of uniform wall thickness.

Specifically, it has been found experimentally (see examples 1 and 2, below) and confirmed by derivation (see summary of invention, above) that for pipe members 24 of uniform wall thickness and having a maximum interior width Di and a maximum exterior width Do, where the pipe member 24 has identical moments of inertia about at least two separate axis in a plane of cross-section through such pipe member 24, that for formation of microbubbles of gas in a liquid 14 (ie bubbles of less than 100 microns) under conditions of standard temperature and pressure, Ae can be less than or equal to, but no greater than Ai×Di/Do where there exist a plurality of apertures 32 in pipe member 24. Where only one aperture 32 exists in pipe member 24, such aperture may only have a cross-sectional area no greater than Ai×Di/2Do.

Figure 5:
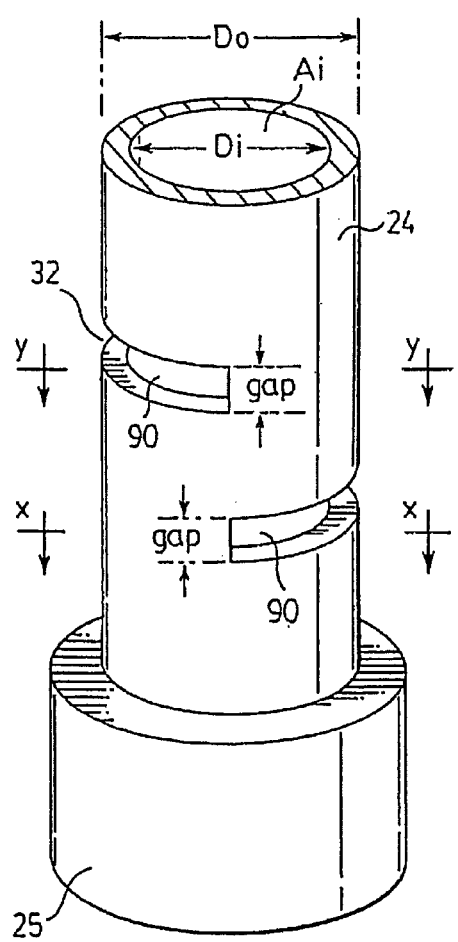
FIG. 5 is an enlarged view of a particular embodiment showing of a pipe member of the present invention of circular cross-section, further showing an embodiment of the pipe member having horizontally-extending rectangular slots formed in such pipe member for acting as apertures to permit the expulsion of a gas-liquid mixture from such pipe member.
Figure 5A:
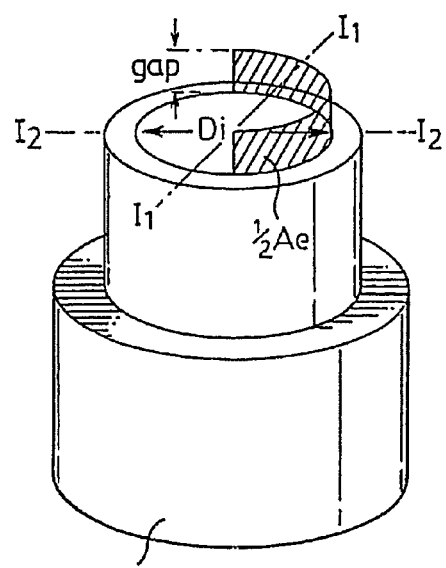
FIG. 5A is a section through the pipe member of FIG. 5, taken along plane X—X.
Figure 5B:
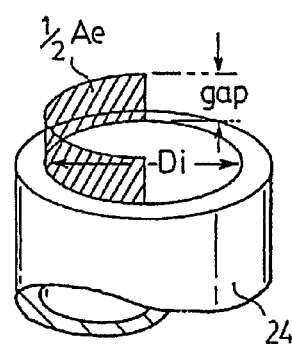
FIG. 5B is a section through the pipe member of FIG. 5, taken along plane Y—Y.

FIG. 5 shows a detail view of a pipe member 24 of the present invention, having a circular cross-section, of maximum internal width Di, and maximum exterior width Do, and internal area Ai=π×Di$^2$/4. FIG. 5 also shows the configuration of pipe member 24 and apertures 32 used to determine the relationship between inlet area Ai and combined aperture exit area Ae. Two rectangular slots 90 were formed in pipe member 24, on opposite sides thereof, each to a depth of ½ Do. Each rectangular slot 90 forms an exit area equal to "gap"×π×Di (see FIG. 5B), so as, in the case of two rectangular slots 90, to form a combined exit area Ae=2×"gap"×π×Di.

It was experimentally found (see example 1, below) that the maximum combined exit area for at least two or more apertures was Ae can be no greater than Ai×Di/Do where bubbles of a size less than 100 microns are desired.

Having a maximum combined exit area Ae means that the aperture "gap" shown in FIG. 5 will be a maximum. Accordingly, where maximum throughput of gas-liquid mixture 22 is required through apparatus 10 of the present invention, the maximum combined aperture exit area Ae is used. Where Ae=Ai×Di/Do, setting this equal to 2×gap×π×Di and solving for the gap, this means the "gap" can only be [Ai×Di/Do]/2×π×Di which stated more simply is equal to Ai/π×Do, where π×Do is the outer circumference of pipe member 24.

Accordingly, in a further embodiment, a further restriction exist on the width of the "gap" shown in FIG. 5, namely that the "gap" be no greater than the quotient of Ai and the outer circumference of pipe member 24, namely π×Do. Stated in other terms, to form bubbles in the extruded jets 56 of gas-liquid mixture 22 which is expelled from rectangular slots 90 comprising apertures 32, such apertures 32 may only be of a maximum vertical depth ("gap") of Ai/C, namely [π×Di$^2$/4]/[π×Do] (ie Di$^2$/4 Do) Thus where the maximum aperture distance (ie the maximum "gap") of Di$^2$/4 Do is used, so as to be required to drill the fewest slots or apertures 32, the maximum "gap" of aperture is typically used, namely Ai/circumference of pipe member 24, which for a cylindrical pipe member 24 is simply Di$^2$/4 Do.

As may be seen from FIG. 5, pipe member 24 possesses uniform wall thickness (ie Do less Di is always a constant). Moreover, as may be seen from FIG. 5A, such pipe member 24 possesses at least two identical moments of inertia in a plane of cross-section, namely the moments of inertia about axis I$_1$ and I$_2$ are identical, namely π/64 [Do$^4$−Di$^4$]

Figure 6:
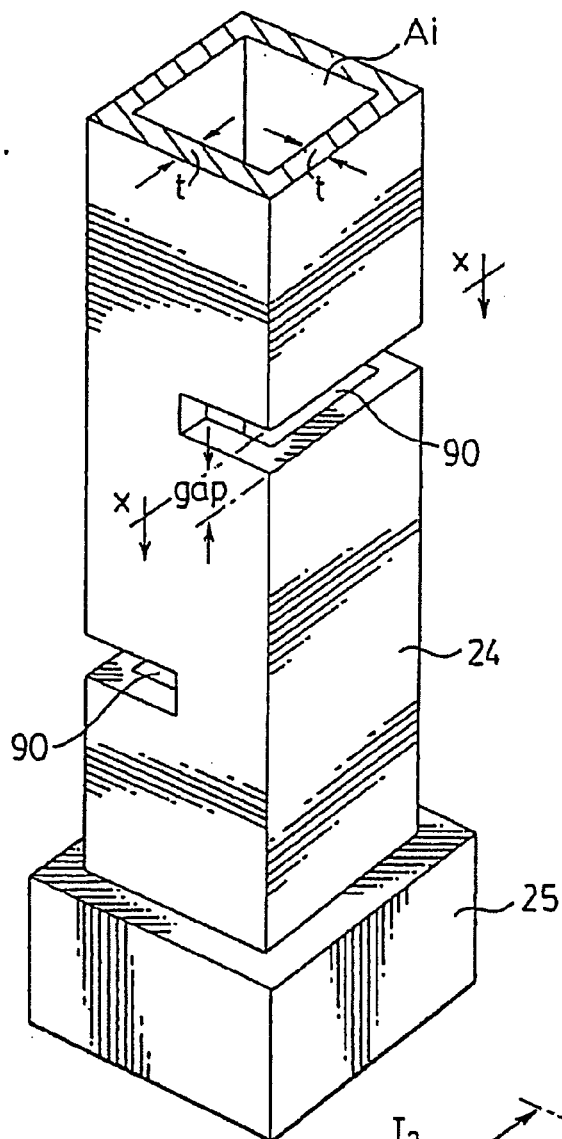
FIG. 6 is an enlarged view of a particular embodiment showing of a pipe member of the present invention of square cross-section, further showing an embodiment of the pipe member having horizontally-extending rectangular slots formed in such pipe member for acting as apertures to permit the expulsion of a gas-liquid mixture from such pipe member.
Figure 6A:
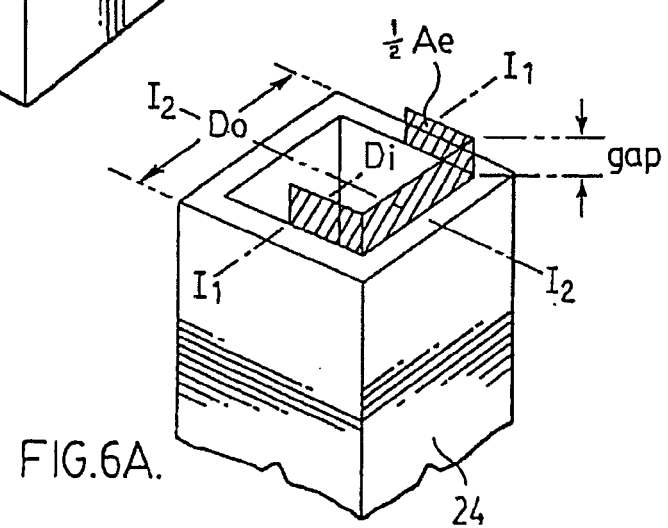
FIG. 6A is a section through the pipe member of FIG. 6, taken along plane X—X.

The same relationship applies in the case of pipe member 24 of square cross-sectional area Ai, as shown in FIGS. 6 and 6A, of uniform thickness "t". Thus for two rectangular slots 90 within square pipe member 24, as may be seen from FIG. 6A, the combined aperture exit area Ae may be calculated as 2×"gap"×[½Di+Di+½Di]. Where the maximum "gap" is determined by the surprisingly-found relationship of Ai/(circumference of pipe), namely Ai/4 Do, then Ae thus becomes 2×Ai/4Do×[2Di]=Ai×Di/Do. Again, a square pipe member 24 has identical moments of inertia about two identical axis I$_1$ and I$_2$ in a plane of cross-section, namely I$_1$=I$_2$=[Do$^4$−Di$^4$]/12

Figures 7, 7A:
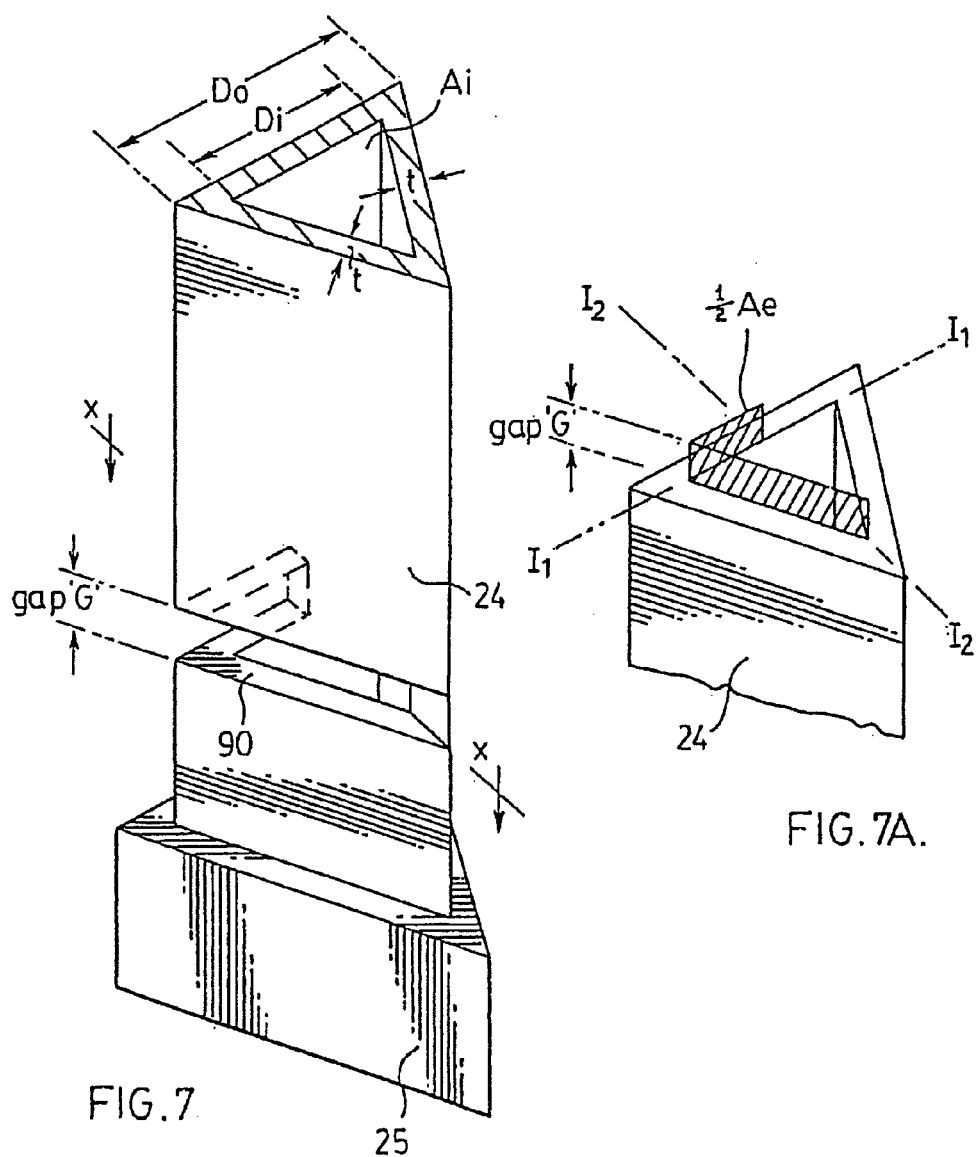
FIG. 7 is an enlarged view of a particular embodiment showing of a pipe member of the present invention of triangular (equal sided) cross-section, further showing an embodiment of the pipe member having horizontally-extending rectangular slots formed in such pipe member for acting as apertures to permit the expulsion of a gas-liquid mixture from such pipe member.
FIG. 7A is a section through the pipe member of FIG. 7, taken along plane X—X.

The same relationship applies in the case of pipe member 24 of triangular (equal sided) cross-sectional area Ai, as may be seen from FIGS. 7 and 7A. Thus for two rectangular slots 90 within equilateral triangular pipe member 24 of depth equal to ½ Do on one side as shown in FIG. 7A, as may be seen from FIG. 7A, the combined aperture exit area may be calculated as 2×"gap"×[1/2Di+Di]. Where the maximum "gap" is determined by the surprising relationship of Ai/C, which in the case of an equilateral triangle of interior maximum width Di equals Ai/3Do, then Ae=2×gap×3/2Di=2×Ai/3Do×3/2Di, which reduces again to Ae=Ai×Di/Do. Again, as may be seen from FIG. 7A, an equilateral sided triangular pipe member 24 has identical moments of inertia about two axis I$_1$ and I$_2$ in a plane of cross-section, namely I$_1$=I$_2$ For a symmetrical pipe member 24 which does not have identical moments of inertia about two axis in a plane of cross-section, such as a rectangular pipe member 24 as shown in FIGS. 8 and 8A (namely I$_1$≠I$_2$), the derived relationship of Ae=Ai×Di/Do does not apply.

Figures 8, 8A:
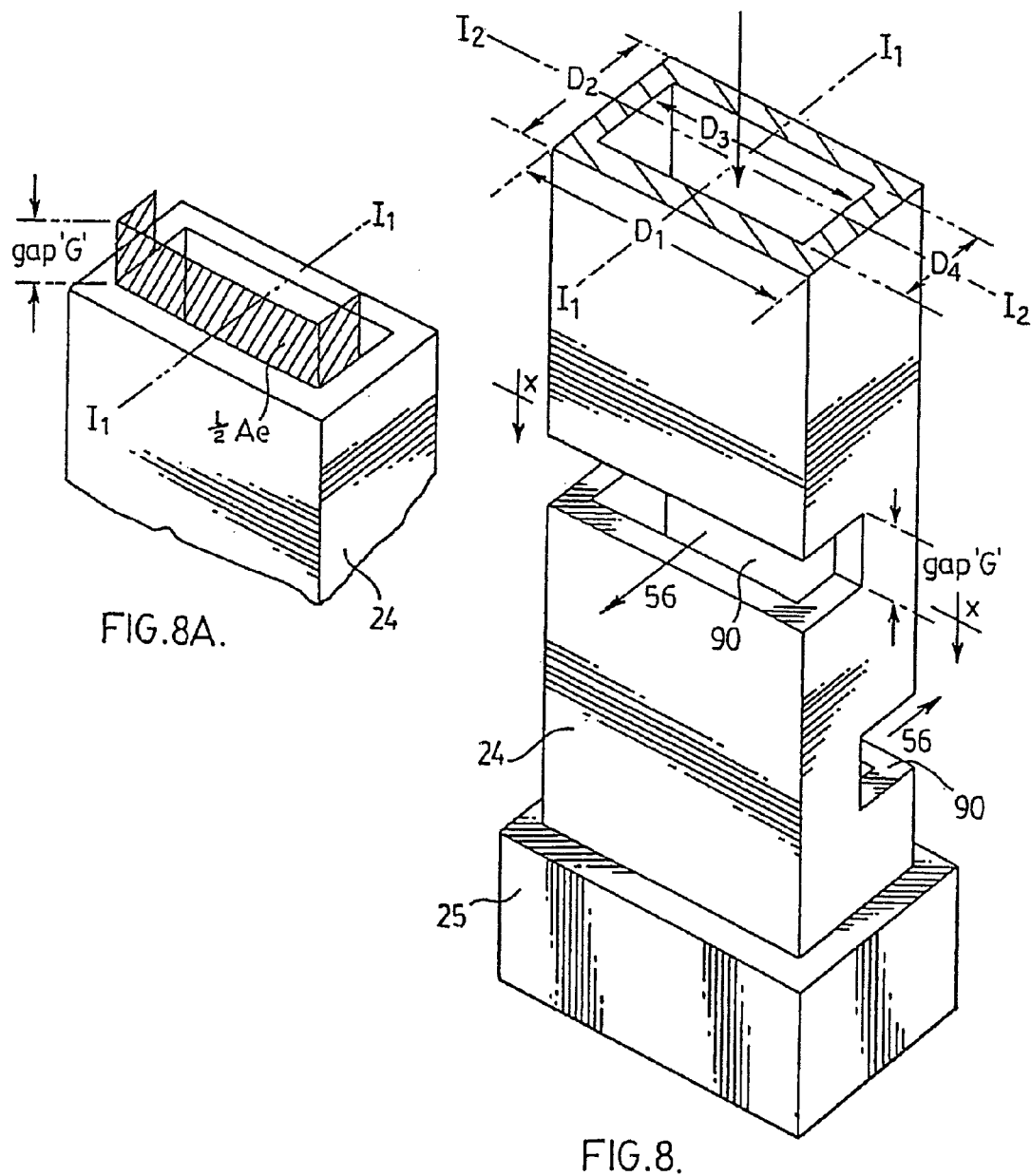
FIG. 8 is an enlarged view of a particular embodiment showing of a pipe member of the present invention of rectangular cross-section, further showing an embodiment of the pipe member having horizontally-extending rectangular slots formed in such pipe member for acting as apertures to permit the expulsion of a gas-liquid mixture from such pipe member.
FIG. 8A is a section through the pipe member of FIG. 7, taken along plane X—X

However, in the case of a rectangular pipe member 24 having maximum exterior dimension D$_1$, minimum exterior dimension D$_2$, maximum interior dimension D$_3$, and minimum interior dimension D$_4$, as shown in FIGS. 8 and 8A, the combined exit area Ae for two rectangular slots 90 as seen in FIG. 8A is determined as 2×"gap"×[½D$_4$+D$_3$+½D$_4$]. Again, using the surprising result that the maximum "gap" equals Ai/C, namely Ai/[2×(D$_2$+D$_1$)], then Ae=2×gap×[D$_4$+D$_3$]=Ai×[D$_4$+D$_3$]/[D$_2$+D$_1$].

With respect to the location of the apertures 32 of the present invention, from which gas-liquid mixture 22 is expelled, apertures 32 may be formed within pipe member 24, as shown in FIG. 1 and particularly in enlarged view shown in FIG. 3 and FIGS. 4 through 8 inclusive. Alternatively, apertures 32 may be formed in plug member 25. FIG. 9, and FIG. 10 showing enlarged detail, illustrate formation of a pair of rectangular slots 90 which serve as apertures 32 in plug means 25. FIG. 11, and FIG. 12 showing enlarged detail, illustrate the employment of a plurality of cylindrical apertures 32 in plug member 25. Of course, as in the case where the apertures 32 are situate within the pipe member 24 itself, such apertures may be of any geometrical cross-sectional area, with circular cross-sectional area being preferred due to the ease in creating cylindrical apertures 32 having circular cross-sectional area, such as by drilling with circular drill bits.

EXAMPLE 1

A series of seventeen various-sized apparatus 10 were constructed in accordance with one of the embodiments of the invention as contemplated herein, namely that embodiment shown in FIG. 1, having a pair of apertures 32 in the form of horizontally-extending rectangular slots 90, as shown in FIG. 5.

Each of the aforesaid seventeen test units comprised a shell (referred to above and below as a vessel 40), having in an upper portion 42 thereof a downwardly extending, substantially vertical cylindrical pipe member 24 of various Di and Do, ranging from nominal pipe nominal diameters of 0.50 inches to 10.0 inches.

Each of pipe members 24 for the various test units had a pair of rectangular opposed slots 90 therein, as shown in FIG. 5. The exit area Ae for the pair of slots was set as the maximum, in accordance with the requirement Ae (max) =Ai×Di/Do. Because the width of each of the slots 90 was the width Di of each pipe member 24 as shown in FIG. 5, the vertical depth (ie "gap") of each of the slots 90 was accordingly thereby pre-determined due to the requirement that Ae=Ai×Di/Do, and was $gap_{(max)}$=Ai/(outer circumference of pipe member 24).

Vessels 40 of various nominal diameter sizes were used and matched with corresponding pipe members 24, with the vessel 40 having a nominal diameter of approximately six times the pipe member 24 nominal diameter. This resulted in a matching of vessels 40 with pipe members 24, wherein the vessel 40 nominal diameter ranged from a nominal 3.0 inch diameter to a 10.0 inch nominal diameter.

Various lengths of vessel 40 were used, ranging from 34.2 inches for a vessel/shell 40 of 3.0 inch nominal diameter, to 260 inches for a vessel 40 of 10.0 inch nominal diameter.

Various lengths of pipe member 24 were used, ranging from approximately 7.30 inches for a pipe member 24 of 3.0 inches nominal diameter, to 12.0 inches for all pipe member diameters of approximately 1.0 inches nominal diameter and greater.

Water at 15° C. and air at 21° C. was used as the liquid and gas, respectively. Water, having bubbles of air of a size greater than 100 microns therein the majority of which were of a range of size between about 100 µm to 3 mm, and under a pressure slightly exceeding 20 psig, was provided to pipe member 24, and sprayed into an upper portion of vessel 40 via rectangular slots 90, such upper portion of the vessel containing gas, under a pressure of approximately 20 psig, which uses slightly less than the supplied pressure due to the pressure drop across the aperture(s), and a lower portion of said vessel containing water having microbubbles therein.

Four inlet flow rates of water were used, namely 6 ft/sec, 7 ft./sec, 8 ft./sec., and 9 ft./sec into the vessel 40 via pipe member 24. A lower withdrawal pipe was used to withdraw water having microbubbles entrained therein from vessel 40, which was then provided in a holding tank (not shown) at ambient atmospheric pressure.

In all seventeen instances for the devices tested, microbubbles were formed in vessel 40 over each of the four volumetric flow rates, of dimensions less than 100 microns.

EXAMPLE 2

Purpose

The purpose of this experiment was to confirm various formula for optimum creation of microbubbles using the apparati of the present invention.

This was done by evaluating the effect of aperture size and apertures exit area on the size of the bubbles produced.

Apparatus

Figure 14:
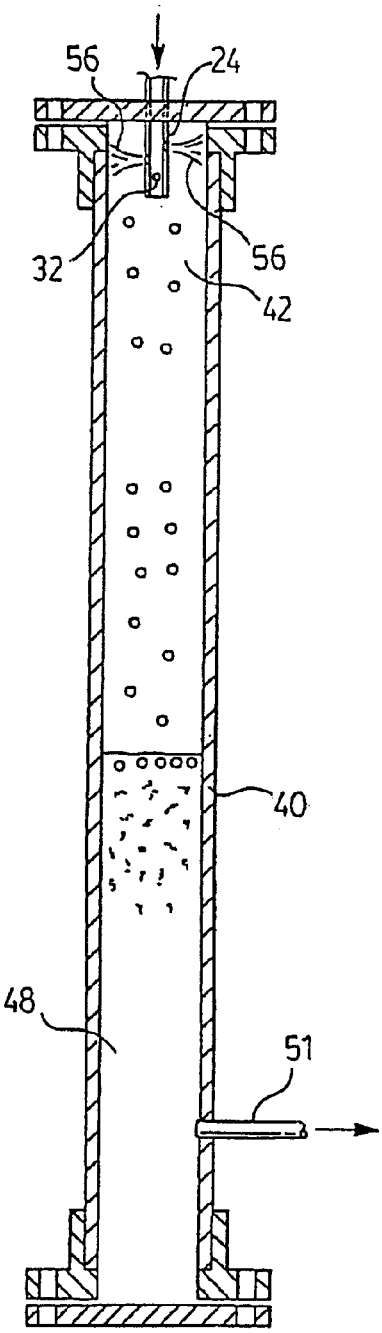

Apparatus of the type shown in FIG. 14 was selected, and in particular an apparatus of FIG. 14 having the dimensions for inlet pipe member OD and ID and (upper) impaction pipe length, as well as shell (vessel) height and diameter.

Figure 15:
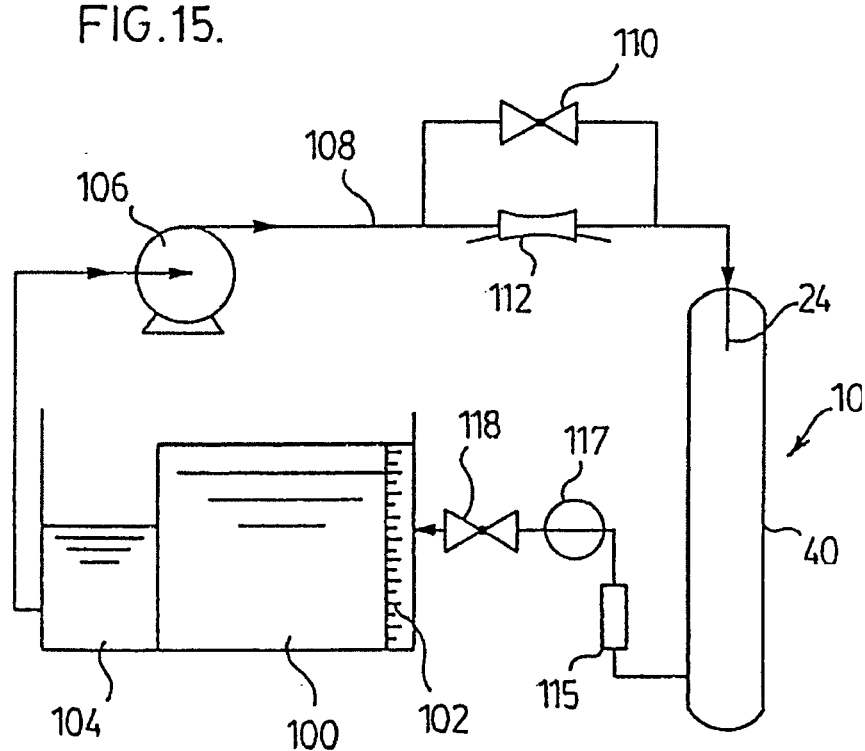
FIG. 15 is schematic view of additional test apparatus used to test the operability of the apparatus and method of the present invention.

FIG. 15 shows associated equipment used with the selected model of apparatus 10 of the present invention in conducting the above tests. A Plexiglas receiving tank 100 was utilized for receiving water having microbubbles entrained therein from apparatus 10 and to permit observation of bubble rise to permit calculation of bubble velocity (used to determine bubble size). A ruler 102 was attached to the outside of the tank to allow form measuring distance travelled by bubbles per a given time interval, to calculate (in the manner described below) the bubble size. A separate tank 104 was provided as a reservoir to permit supply of water to pump 106. Additional piping 108 permitted supply, via a globe valve 110 and venturi nozzle 112 to pipe member 24 of apparatus 10. Water exiting vessel 40 of apparatus 10 passed through a flow meter 115 and pressure gauge 117, and then through a globe valve 118 to Plexiglas tank 100.

Procedure

Pipe members 24 were created, having horizontally-extending cylindrical apertures 32, of diameter, number, and combined exit area Ae as recorded in FIG. 16.

Each combination of hole (aperture) size and exit area was tested with the same standard procedure set out below Each test was run under the same conditions of back pressure (i.e. pressure of gas in the upper portion of vessel 40, namely approximately 20 psi), flow rate, water volume, water temperature, and pressure drop across the Venturi nozzle. The same apparatus 10 was used for all the tests, and pipe member 24 was changed between runs.

Measuring the rise of the bubbles against time permitted determination the size of the average bubble in the tank.

The apparatus 10 was connected to the Plexiglas pump 100 and pump 106.;

Valve 118 from tank 100 was opened to allow equilibrium level between tank 100 and vessel 40 of apparatus 10;

Pump 106 was started and allowed to run until constant level was achieved in vessel 40 of apparatus 10;

Valve 110 controlling flow through venturi nozzle 112 was adjusted to create a 20 psi drop across the nozzle 112;

The back pressure on vessel 40, namely the pressure of the gas in upper portion of vessel 40, was then adjusted to 20 psi;

The apparati 10 and test equipment was left to run for 3.5 minutes;

Pump 106 was turned off and valve 118 between vessel 40 and tank 100 was closed;

Once a clear view at the bottom to the rear of the tank 100 was established bubble rise was monitored and recorded at the given time intervals;

Once tank 100 became clear of bubbles the top of vessel 40 was removed and pipe member 24 was changed to a pipe member having differing number and/or diameter of apertures;

The above procedure was repeated for pipe members 24 having apertures 32 of various number and/or diameter, to determine the effect of area and hole size on the vessel's performance.

The results of the measurements, and resulting calculations, are compiled in Table 16.

Calculations

The design uses the formula:

$$A_i = \frac{\pi \times D_i^2}{4} \qquad \text{Eqn. 1}$$

where:
$A_i$=inlet area
$D_i$=inside diameter of pipe

This formula defines the inlet area of pipe on the vessel 40. The inlet area Ai is used to determine the gap size or maximum hole dimension.

$$\text{Gap} = \frac{A_i}{\pi \times D_o} \qquad \text{Eqn. 2}$$

where:
Gap=hole dimension or Gap size
$A_i$=inlet area
$D_o$=outside diameter of pipe This formula defines the maximum length of one of the holes' dimensions. The maximum combined aperture exit area Ae is determined using the pipes' dimensions in the following formula:

$$A_e = D_i \times \pi \times \text{Gap} \qquad \text{Eqn. 3}$$

combining equations #1, #2, and #3 results in:

$$A_c = \frac{\pi \times D_i^3}{4' D_o}$$

where:
$A_c$=maximum exit area
Di=inside diameter of pipe
$D_o$=outside diameter of pipe This formula defines the maximum area that will produce the desired microbubbles. Exit areas less than this value are capable of producing the microbubbles whereas any area greater than this does not produce bubbles that are sufficiently small. Both the hole size and exit area are parameters that effect the size of the bubbles that are produced by the vessel.

Using Stoke's Law the size of the bubbles produced is determined by the rise velocity of these bubbles. Stokes Law states:

$$v = \frac{g(\rho_w - \rho_a) D^2}{18\mu} \qquad \text{Eqn. 4}$$

where:
v=velocity of bubble rise
g=gravitational constant
$\rho_w$, $\rho_a$=density of wafer and air μ=viscosity of fluid
D=diameter of gas bubble in fluid Each of the experimental runs produced data which appear in FIG. 16. Each experimental run is also accompanied by a corresponding hole diameter, number of holes and exit area.

Time and distance traveled were used to calculate the rise velocity.

$$v = \frac{d_2 - d_1}{t_2 - t_1} \qquad \text{Eqn. 5}$$

with the following units
v—mm/s
d—mm
t—sec

The rise velocity from each interval was used to calculate the corresponding bubble diameter using a form of Stoke's Law:

$$D = \sqrt{\frac{18 \, v \times \mu}{g(\rho_w - \rho_a)}} \qquad \text{Eqn. 6}$$

where
D=diameter (cm)
v=velocity (cm/s)
μ=viscosity of water (Poise)=0.0112 P
g=gravitational constant=981 cm/s$^2$
$\rho_w$=density of water=0.99913 g/cm$^3$@15° C.
$\rho_a$=density of air=1.239 mg/cm$^3$@15° C.

The number of holes, the hole diameter and the resulting exit area were determined using the following equation.

$$A_e = NH * D_A^2 \frac{\pi}{4} \qquad \text{Eqn. 7}$$

where:
$A_c$=exit area
NH=number of holes $\pi Di^2$
$D_A$ hole diameter

Sample Calculations

The first calculation needed was to determine the maximum exit area $$D_i = 0.824 \quad D_o = 1.05 \quad A_e = \frac{\pi \times D_i^3}{4 \times D_o}$$

$A_c$=0.418487 in$^2$

The following calculations are those used to determine the exit area at a given hole size and number.

$$NH = 21; \, Dia = \frac{5}{32} \text{"} A_e = NH \times D_A^2 \frac{x\pi}{4}$$

$A_e$=0.4026 in$^2$

The following are a set of sample calculations for one interval. The calculations find the rise velocity of the bubbles and their corresponding diameters.

$$d_2 = 4; \quad d_1 = 3; \quad t_1 = 5; \quad t_2 = 10; \quad v = \frac{d_2 - d_1}{t_2 - t_1};$$

v=0.2 μm/s
D=0.00202948 cm
Results

Results of the above tests are found in FIG. 16. FIG. 16 lists the drill sizes used for creating the apertures, the number of holes (apertures), and the corresponding combined exit area Ae for each pipe member (nozzle) 24, as well as the resulting bubble size.

As may be seen from FIG. 16, where the combined exit area Ae of the apertures exceeded the pre-determined exit area of Ai×Di/Do, namely exceeded 0.418487 in$^2$, the bubble size was greater than 50 microns. (ref. those tests where bubble diameter was 68.26, 53.2, 68.45, 53.6, 58.71, 65.60 and 82.44 μm respectively).

As may also be seen from FIG. 16, where the aperture diameter was greater than Ai/(outer circumference of pipe member 24), namely greater than 0.161 inches, the average bubble size was greater than 50 microns.

Where the combined aperture exit area Ae was less than or approximately equal to Ai×Di/Do, namely less than or equal to 0.418487 in$^2$ and the aperture diameter less than or equal to Ai/(outer circumference of pipe member 24), bubble size was less than 50 microns.

Figure 17:
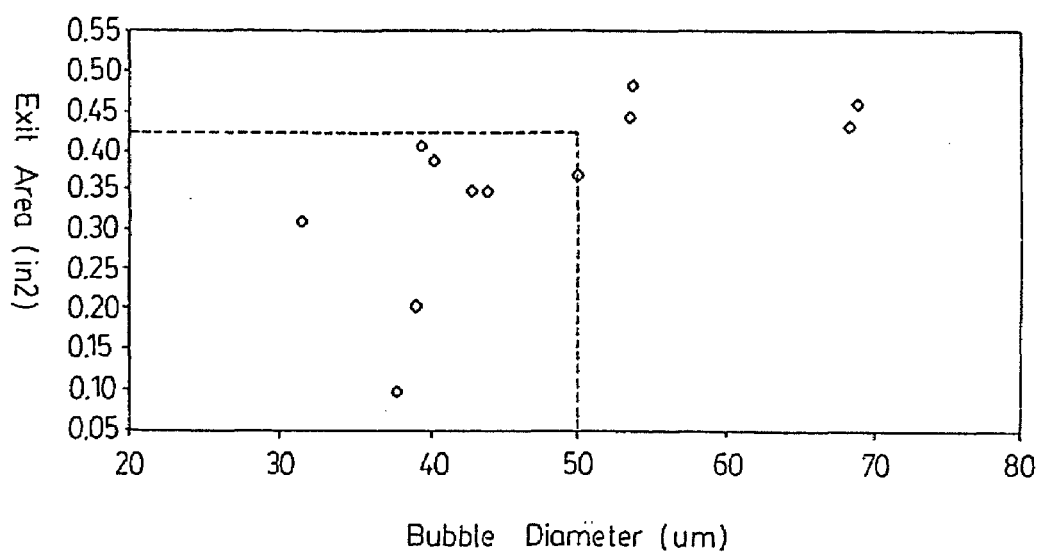
FIG. 17 is a graph showing a plot of aperture exit area Ae as a function of bubble diameter, such data obtained from data using the test apparatus shown in FIGS. 14 and 15.

FIG. 17 is a graph prepared from that illustrates a relationship between combined exit area Ae and bubble diameter. The average diameter from the first 30 seconds (in most cases) was plotted against the exit area. FIG. 17 demonstrates a defined relationship between the two variables that occurs while the hole diameter is held constant. This gives evidence of the influence of exit area on bubble size. The larger the exit area the larger the size of the bubbles produced.

FIG. 17 has an area that is below and to the right of the dotted line. Such represents a design configuration of the apparatus 10 of the present invention which produces microbubbles in the desired range of less than 50 microns.

Although the disclosure describes and illustrates selected embodiments of the invention, it is to be understood that the invention is not limited to these particular selected embodiments. Many variations and modifications will now occur to those skilled in the art. For a complete definition of the scope of the invention, reference is to further be had to the summary of the invention and in particular the appended claims.

We claim:

1. An apparatus for creating microbubbles of gas in a liquid, comprising:
   a containment vessel adapted to be positioned vertically and adapted to contain a volume of gas in an upper portion thereof under a second pressure exceeding ambient by at least 10 psi;
   elongate, hollow pipe means for providing said liquid to an interior of said vessel, having a longitudinal axis and of uniform wall thickness and having an interior cross-sectional area $A_i$, said pipe means situate in said containment vessel and proximate said upper portion of said containment vessel and extending substantially vertically downwardly within said vessel, adapted for supplying a liquid under a first pressure greater than said second pressure to an interior of said vessel, said pipe means comprising a substantially rectangular pipe member of substantially rectangular exterior and interior dimensions, having a major exterior side length $D_1$ and a minor exterior side length $D_2$ and a major interior side length $D_3$ and a minor interior side length $D_4$ further having plug means situate at a distal end thereof for preventing egress of liquid vertically downward from said distal end;
   at least two apertures situate in said rectangular pipe member and disposed substantially perpendicular to a longitudinal axis of said pipe means extending from an interior of said pipe means to an exterior of said pipe means, each adapted to direct said liquid substantially horizontally outwardly from said pipe means, of combined cross-sectional exit area $A_c$; and
   said exit area $A_c$ of said apertures defined as a function of widths $D_1$, $D_2$, $D_3$, and $D_4$ and said cross-sectional area $A_i$ of said pipe means, wherein $A_c$ is no greater than:

$A_i \times [D_3+D_4]/[D_1+D_2]$.

2. The apparatus as claimed in claim 1 wherein each aperture has a cross-sectional exit area no greater than $A_i \times [D_3+D_4]/2[D_1+D_2]$.

3. The apparatus as claimed in claim 1 or 2, said rectangular pipe member having an exterior circumference C, wherein said apertures comprise cylindrical apertures each of diameter $D_A$, where $D_A$ is less than $A_i/C$.

4. The apparatus as claimed in claim 1 or 2, said pipe member having an exterior circumference C, wherein said apertures comprise at least a pair of horizontally-extending rectangular slots in said pipe means, disposed on substantially mutually opposite sides of said pipe means, each of a width substantially equal to said maximum interior width $D_i$ of said pipe means, and each of a vertical depth no greater than $A_i/C$.

5. A method for creating microbubbles of gas in a liquid, comprising:
   providing gas to said liquid to form a gas/liquid mixture;
   directing said gas/liquid mixture into a rectangular hollow pipe member of rectangular interior cross-sectional area Ai, having at least two apertures therein, said rectangular pipe member having a major exterior side length $D_1$, and minor exterior side length $D_2$, and a major interior side length $D_3$ and a minor interior side length $D_4$, further having plug means situate at a distal end thereof for preventing egress of said gas/liquid vertically downward from a distal and thereof;
   injecting said gas/liquid mixture at a first pressure into a vertically-positioned containment vessel having a volume of gas in an upper portion thereof under a second pressure less than said first pressure but exceeding ambient by at least 10 psi, via said at least two apertures in said pipe member, said apertures disposed substantially perpendicular to a longitudinal axis of said pipe member and of a combined cross-sectional exit area Ae, each extending from an interior and said pipe member to an exterior thereof;
   directing said gas/liquid mixture substantially horizontally outwardly from said pipe member vertically disposed in an upper portion of said vessel, via said apertures, said exit area $A_c$ of said apertures being no greater than $Ai \times [D_3+D_4]/[D_1+D_2]$.

* * * * *